US006115543A

United States Patent [19]

Murata

[11] Patent Number: 6,115,543

[45] **Date of Patent: *Sep. 5, 2000**

[54] DATA COMMUNICATION APPARATUS HAVING A HANDY SCANNER

[75] Inventor: Yukio Murata, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/262,369

[22] Filed: Jun. 20, 1994

Related U.S. Application Data

[63] Continuation of application No. 07/607,656, Oct. 31, 1990, abandoned.

[30] Foreign Application Priority Data

| | | | |
|---|---|---|---|
| Nov. 1, 1989 | [JP] | Japan | 1-282910 |
| Dec. 6, 1989 | [JP] | Japan | 1-317302 |

[51] Int. Cl.[7] ...... G06F 17/30

[52] U.S. Cl. ...... 395/102; 707/525

[58] Field of Search ...... 358/449, 450; 395/102; 707/525

[56] References Cited

U.S. PATENT DOCUMENTS

| | | | |
|---|---|---|---|
| 4,081,843 | 3/1978 | Okano | 358/482 |
| 4,260,979 | 4/1981 | Smith | 382/59 |
| 4,396,952 | 8/1983 | Tisue et al. | 358/260 |
| 4,467,448 | 8/1984 | Regehr et al. | 395/115 |
| 4,566,002 | 1/1986 | Miura et al. | 340/727 |
| 4,626,925 | 12/1986 | Toyoda | 358/494 |
| 4,628,534 | 12/1986 | Marshall | 382/41 |
| 4,631,596 | 12/1986 | Yaguchi | 358/449 |
| 4,717,965 | 1/1988 | Mashiko et al. | 358/473 |
| 4,797,544 | 1/1989 | Montgomery et al. | 250/221 |
| 4,837,845 | 6/1989 | Pruett et al. | 382/46 |
| 4,860,110 | 8/1989 | Kukubu | 358/400 |
| 4,866,535 | 9/1989 | Kubota et al. | 358/474 |
| 4,882,629 | 11/1989 | Faulkerson et al. | 358/464 |
| 4,887,165 | 12/1989 | Sato et al. | 358/474 |
| 4,912,771 | 3/1990 | Komine et al. | 382/46 |
| 4,916,747 | 4/1990 | Arimoto | 382/47 |
| 4,924,324 | 5/1990 | Takaoka | 358/486 |
| 4,928,252 | 5/1990 | Gabbe et al. | 395/102 |
| 4,952,920 | 8/1990 | Hayashi | 340/727 |
| 4,969,054 | 11/1990 | Tsuji et al. | 358/473 |
| 5,012,349 | 4/1991 | De Fay | 358/296 |
| 5,027,289 | 6/1991 | Sugimoto | 395/103 |
| 5,057,937 | 10/1991 | Muramatsu et al. | 358/405 |
| 5,079,724 | 1/1992 | Shiraki et al. | 395/146 |
| 5,119,081 | 6/1992 | Ikehira | 340/723 |
| 5,133,025 | 7/1992 | Koyama et al. | 382/46 |
| 5,319,471 | 6/1994 | Taker et al. | 358/451 |

FOREIGN PATENT DOCUMENTS

| | | |
|---|---|---|
| 63-240258 | 10/1988 | Japan . |
| 1132267 | 5/1989 | Japan . |
| 1165261 | 6/1989 | Japan . |
| 1165262 | 6/1989 | Japan . |
| 1236772 | 9/1989 | Japan . |

OTHER PUBLICATIONS

Bermant, "The Complete PC Lines Up A Handful Of Scanners", PC–Computing V2, R9, PP. 44, Sept. 1989.

*Primary Examiner*—Jack M. Choules
*Attorney, Agent, or Firm*—Fitzpatrick, Cella, Harper & Scinto

[57] ABSTRACT

A data communication apparatus having a generator for generating an image data of an irregular size; a converter for converting the irregular size of the image data into a regular recording size; and a transmitter for transmitting the image data converted by the converter; wherein the converter converts the image data of the irregular size into the regular recording size through column/line exchange.

28 Claims, 18 Drawing Sheets

| IMAGE MEMORY ADDRESS | IMAGE DATA |
|---|---|
| z<br>z + 1<br>z + 2<br>⋮<br>z + x − 1 | ( 0, 0 )<br>( 1, 0 )<br>( 2, 0 )<br>⋮<br>( x-1, 0 ) |
| z + x<br>z + x + 2<br>z + x + 3<br>⋮ | ( 0, 1 )<br>( 1, 1 )<br>( 2 , 1 )<br>⋮ |
| z + 2x<br>⋮ | ( 0, 2 )<br>( 1, 2 )<br>⋮ |
| z + ( $\ell$ - 1 ) x<br>z + ( $\ell$ - 1 ) x + 1<br>z + ( $\ell$ - 1 ) x + 2<br>⋮<br>z + $\ell$ x - 1 | ( 0, $\ell$ -1)<br>( 1, $\ell$ -1)<br>( 2, $\ell$ -1)<br>⋮<br>( x-1, $\ell$ -1) |

| IMAGE MEMORY ADDRESS | STORED DATA |
|---|---|
| $z + (\ell - 1)x$ | $(0, \ell - 1)$ |
| $z + (\ell - 1)x + 1$ | $(1, \ell - 1)$ |
| ⋮ | ⋮ |
| $z + (\ell - 1)x + n - 1$ | $(n - 1, \ell - 1)$ |
| $z + (\ell - 1)x + n$ | $(n, \ell - 1)$ |
| ⋮ | ⋮ |
| $z + (\ell - 1)x + 2n - 1$ | $(2n - 1, \ell - 1)$ |

| IMAGE MEMORY ADDRESS | STORED DATA |
|---|---|
| $z + (\ell - 1) x$ | $(0, \ell - 1)'$ |
| $z + (\ell - 1) x + 1$ | $(1, \ell - 1)'$ |
| ⋮ | ⋮ |
| $z + (\ell - 1) x + n - 1$ | $(n - 1, \ell - 1)'$ |
| $z + (\ell - 1) x + n$ | $(n, \ell - 1)'$ |
| ⋮ | ⋮ |
| $z + (\ell - 1) x + 2n - 1$ | $(2n - 1, \ell - 1)'$ |

DATA COMMUNICATION APPARATUS HAVING A HANDY SCANNER

This application is a continuation of application Ser. No. 07/607,656 filed Oct. 31, 1990, now abandoned.

BACKGROUND OF THE INVENTION

1. Field of the Invention

The present invention relates to a data communication apparatus capable of sending and receiving image data of irregular size.

2. Related Background Art

As apparatuses of this type, facsimile apparatuses are known. Facsimile apparatuses for sending and receiving image data through a telephone line or a digital network have been recently used widely in companies and homes.

Most facsimile apparatuses transmit an original of a regular size determined by CCITT Recommendations. For example, if an original to be transmitted is A4 size and it is read at a reading resolution of 8×7.7 pel/mm, the original is read one line after another in units of 1728 bits in the main scan direction and thereafter it is transmitted.

As facsimile apparatuses are used more and more in homes, it can be expected that a handy scanner of a small size and low cost will be used as an image reader. The length in the main scan direction read with a small handy scanner is considerably smaller than the regular image data size (e.g., A4 paper size and 1728 bits at resolution of 8×7.7 ppi) determined by CCITT Recommendations.

Most facsimile apparatuses presently available in markets have as their recording paper sheets only roll-type regular size paper sheets. Accordingly, if image data read with a small handy scanner is transmitted as a regular size image with the blank bit portion being transmitted as white, a wasteful large blank portion is received at a receiving side.

Furthermore, with respect to facsimile apparatuses having a function to store a large capacity of transmitted or received images, each time stored image data is read out for search by scroll using a display unit the resolution of the image data is converted into so as to match the resolution of the display unit.

Since the stored image data is converted and outputted to match the resolution of the display unit when a request of displaying the image data is instructed, it takes a lot of time to read out the image data and convert the resolution. Therefore, speeding up of such processes requires a large scale of hardware so that there is a limit in speeding up.

The technique regarding transmission of an irregular size image data is disclosed in U.S. Pat. No. 4,712,139 and U.S. patent application Ser. No. 049,948 filed on Mar. 29, 1988, abandoned. However, the technique for solving the above is not know as yet.

SUMMARY OF THE INVENTION

Considering the above problems, the present invention aims at improving a data communication apparatus.

It is another object of this invention to provide a data communication apparatus capable of efficiently recording an image.

It is a further object of this invention to provide a data communication apparatus capable of recording an image of an irregular size.

It is a still further object of this invention to provide a data communication apparatus capable of recording images of a plurality of sheets on a single sheet of paper.

It is another object of this invention to provide a data communication apparatus capable of storing image data and searching a display image at high speed.

The above and other objects of this invention will become apparent from the following detailed description of embodiments when read in connection with the accompanying drawings.

DETAILED DESCRIPTION OF THE PREFERRED EMBODIMENTS

Embodiments of this invention will be described with reference to the accompanying drawings.

Figure 1:
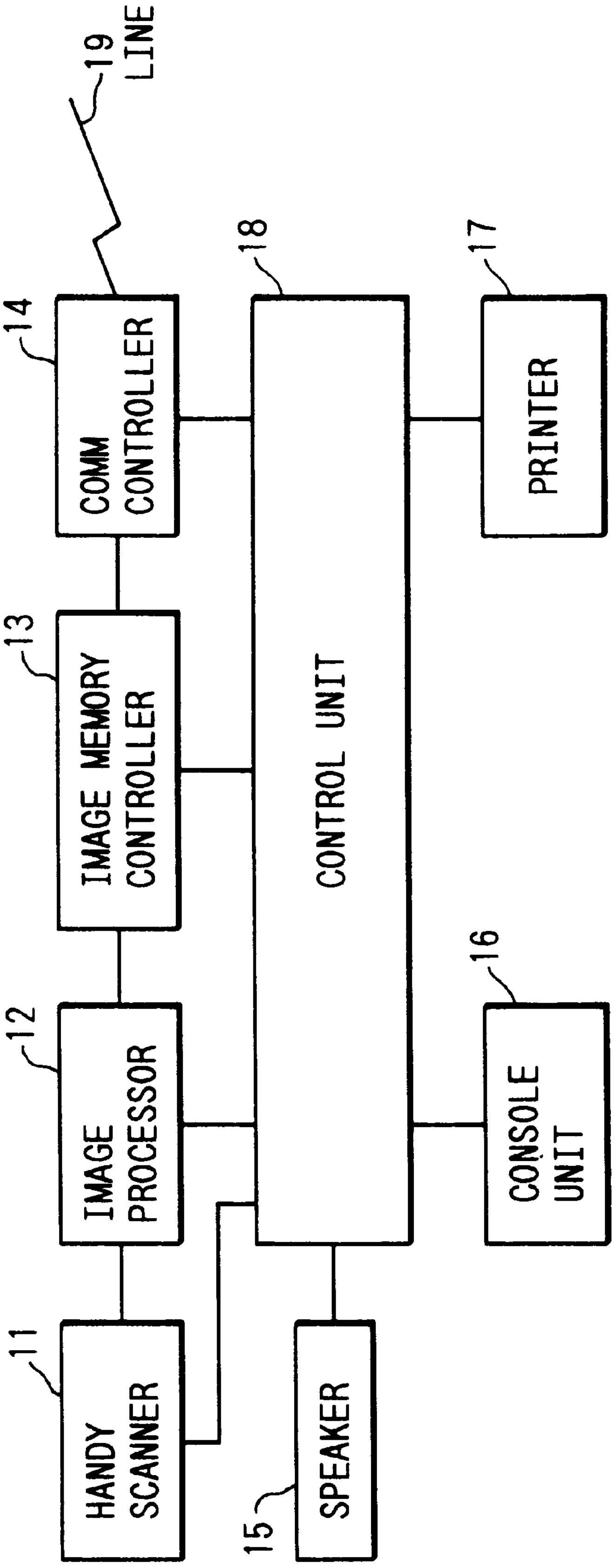
FIG. 1 is a block diagram showing the structure of a facsimile apparatus according to a first embodiment of this invention.

FIG. 1 is a block diagram showing the first embodiment of this invention.

Figure 2:
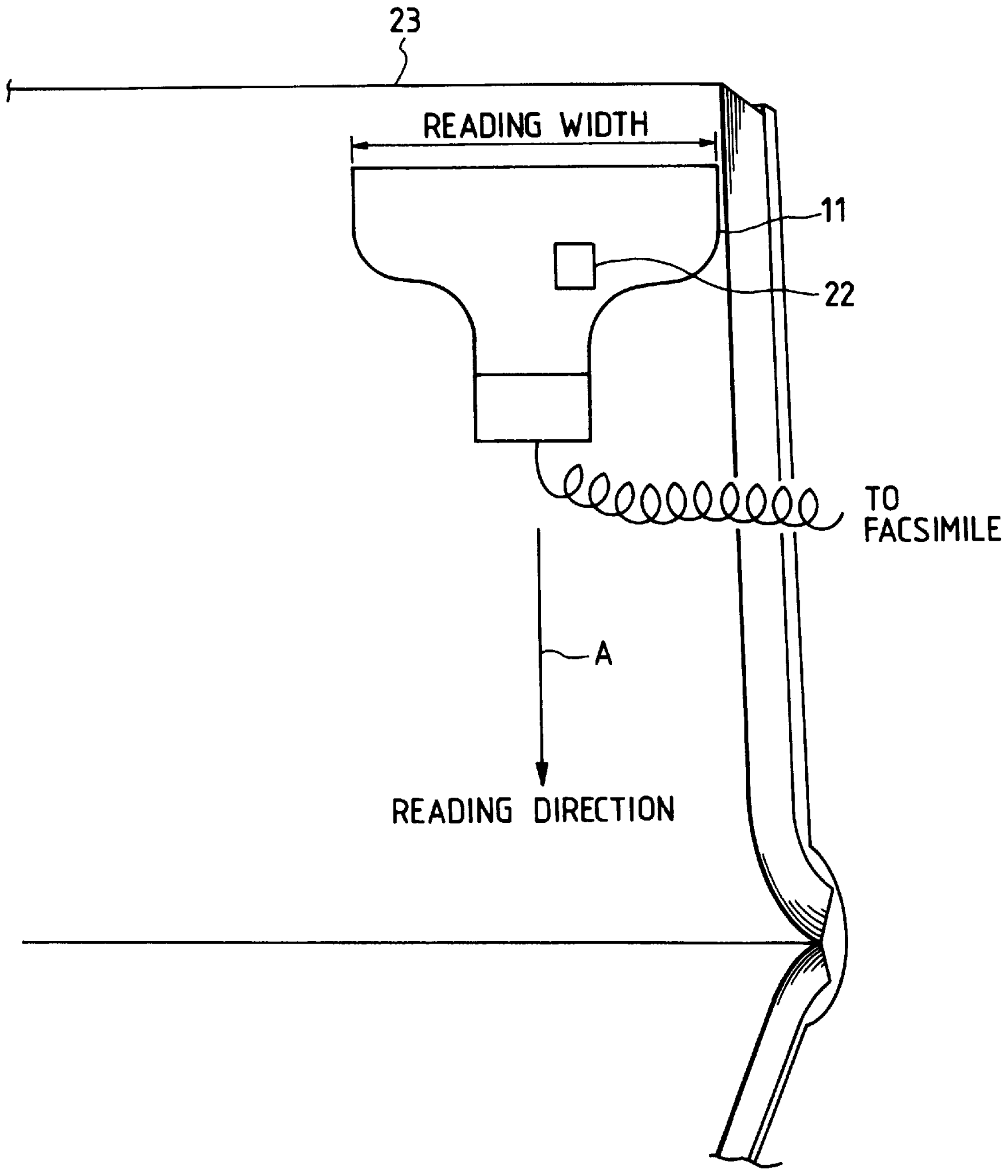
FIG. 2 is a plan view illustrating the reading operation by a handy scanner according to the first embodiment.

A handy scanner 11 is held with a hand to scan an original image as shown in FIG. 2, and is connected via cable to a facsimile apparatus.

An image processor 12 has a function to binarize (i.e. to convert to binary data) the multi-value density data of a read-out image.

An image memory controller 13 stores binarized image data or received image data.

A communication controller 14 controls the communication procedure and the like, encodes and transmits image data, and decodes encoded and received data. The communication controller 14 has a modem for modulating and transmitting data and demodulating data from the line 19.

A loudspeaker 15 generates alarm sounds or the like.

A console unit 16 is constructed of various input key switches, a key input scan circuit, a liquid crystal display, and the like.

A printer 17 outputs image data stored in an image memory of the image memory controller 13.

A control unit 18 is constructed of a micro-computer, ROM, RAM and the like, and executes a control program stored in ROM to thereby control the operation of the apparatus.

The operation of the facsimile apparatus constructed as above will be described next.

The handy scanner 11 has a line CCD sensor whose width corresponds to an image reading width, and reads an image one line after another. For example, as shown in FIG. 2, when a read switch 22 is depressed, an LED array turns on to illuminate an image surface 23 and becomes ready for reading. As the handy scanner 11 is moved in the direction indicated by arrow A, a line synchronization signal is generated in synchronization with rotation of a rubber roller mounted at the bottom surface of the handy scanner 11. In synchronism with this line synchronization signal, the CCD sensor reads image data which is converted into a serial signal and transmitted to the facsimile apparatus. The image data is binarized by the image processor 12, and stored in the image memory of the image memory controller 13 for line/column exchange thereof.

This line/column exchange is executed by a memory address control unit, an n×n column/line exchange circuit, and the image memory respectively provided within the image memory controller 13.

The above processes will be detailed below.

Figure 3:
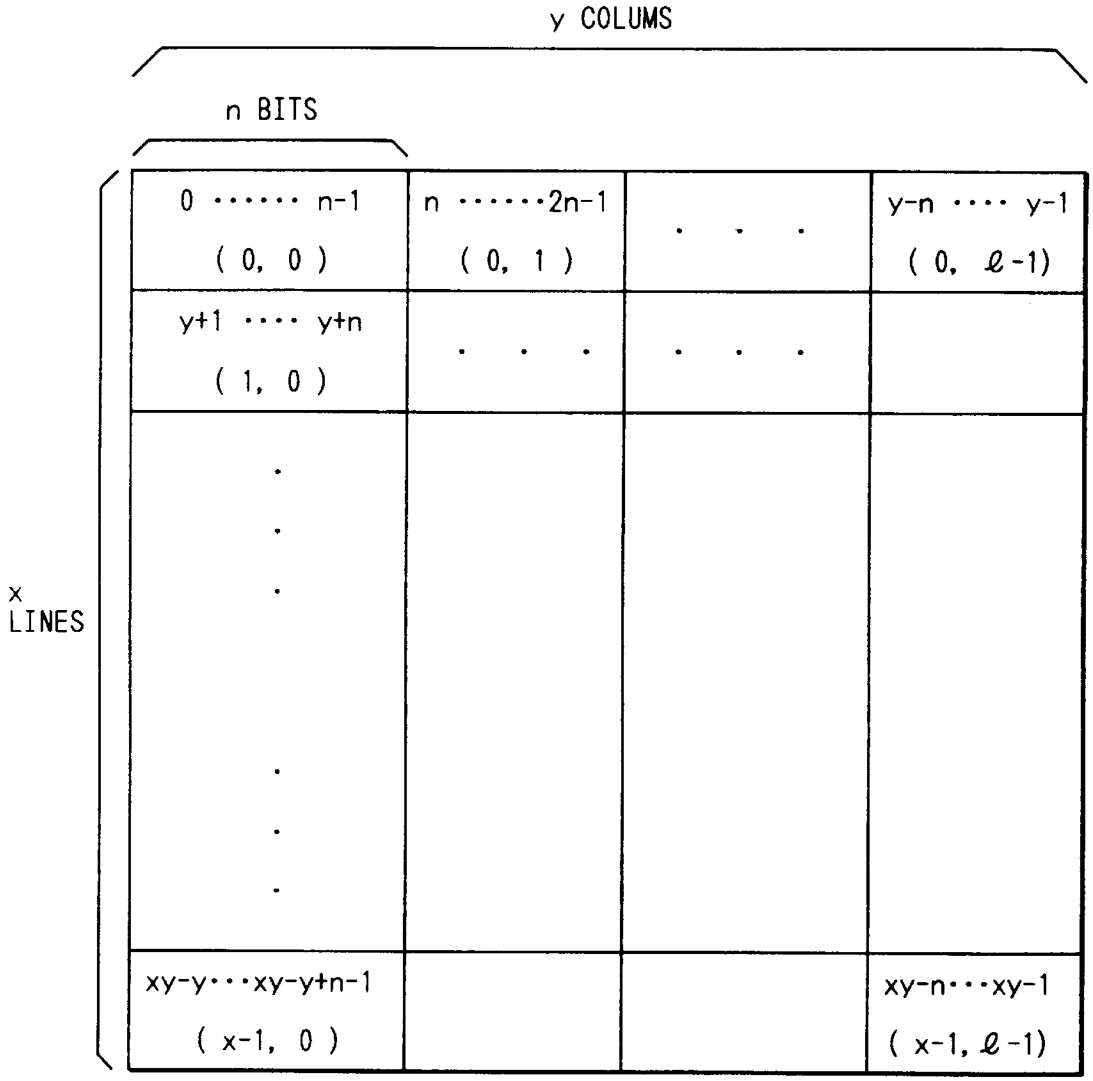
FIG. 3 is a schematic diagram showing a bit map of image data according to the first embodiment.

It is assumed that image data read with the handy scanner is a bit map data having x lines and y columns as shown in FIG. 3, where $(m-2)n<x\leqq(m-1)n$, and $(l-2)n<y\leqq(l-1)n$.

On each line, one word is written by n bits. For example, on the first line, there are written 1 words including a word (0, 0) of n bits of 0 to n−1 to a word (0, (l−1)) of n bits of y−n to y−1.

Figures 4, 5:
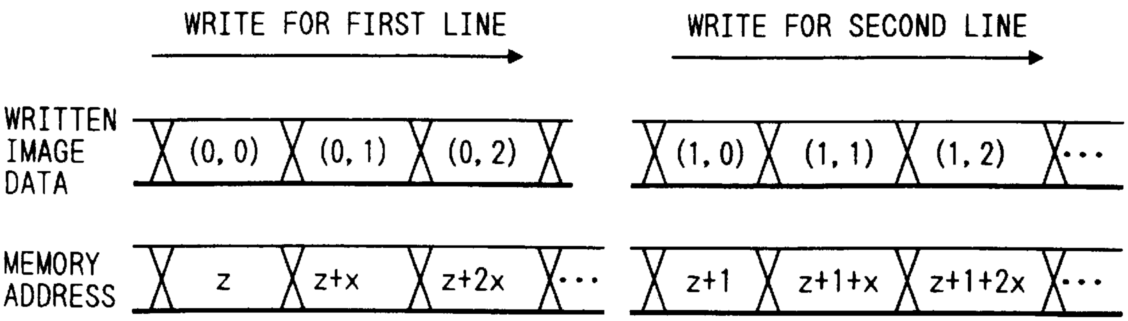
FIG. 4 is a timing chart showing writing image data and memory addresses according to the first embodiment.
FIG. 5 is a schematic diagram showing a memory map how data is written according to the first embodiment.

As shown in FIG. 4, assuming that the first line is written in the image memory at an address z, the following words are written at addresses each incremented by x from the address z.

The second line is written at an address z+1 and the following words are written at addresses incremented by x from the address z+1.

The image data is stored in the image memory of the image memory controller 13 at memory addresses outputted from the image memory controller 13, in such a state that n-bit words are divided into each column as shown in FIG. 5.

Figure 6:
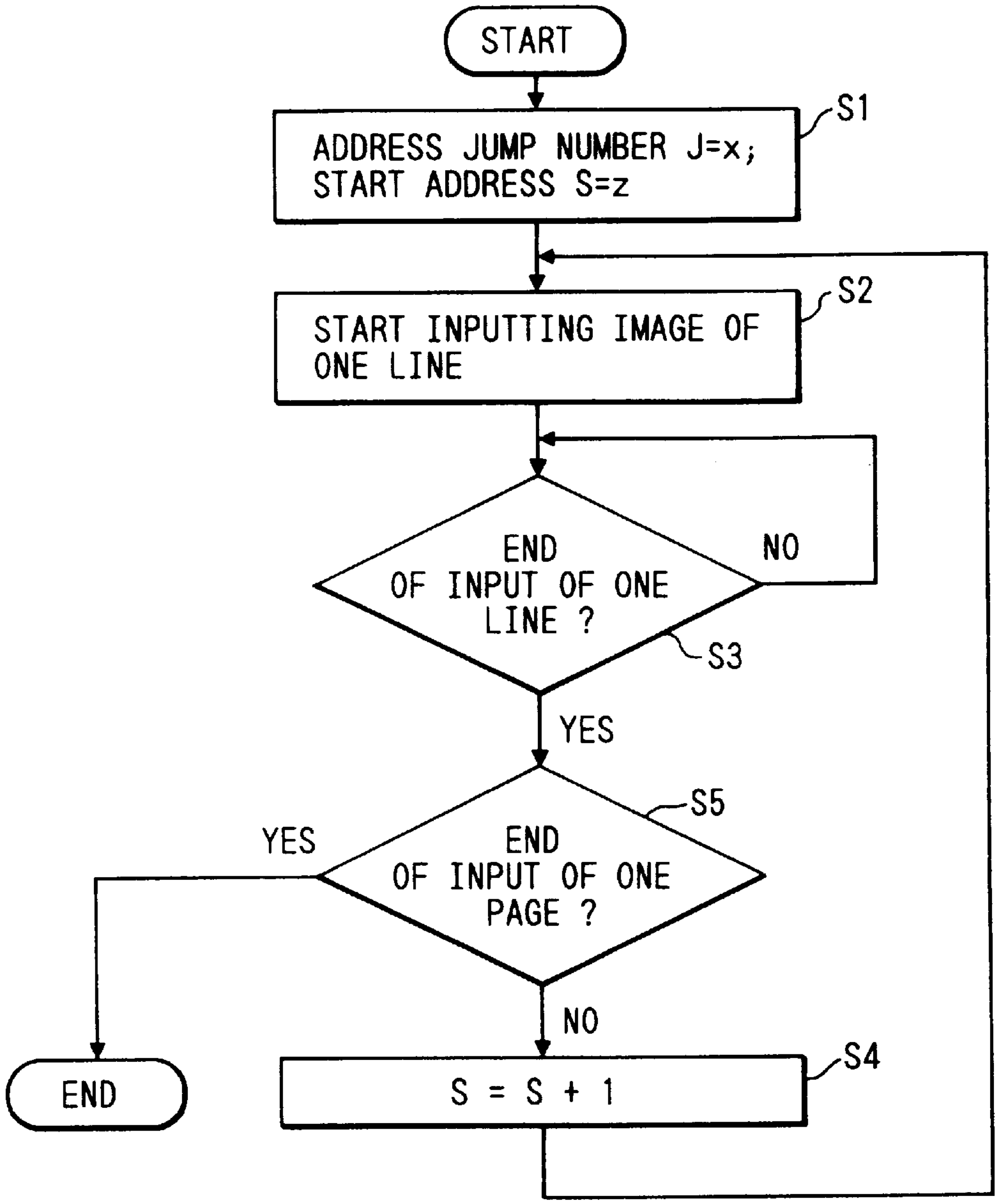
FIG. 6 is a flow chart illustrating image data writing operation according to the first embodiment.

FIG. 6 is a flow chart illustrating the data input operation into the image memory.

When an image is inputted to the image memory, the read address z of the image data is set as a start address S of the image memory, and the number x of lines is set as a memory address jump number J (step S1).

Next, one line image data starts being inputted (step S2). In this input operation, memory addresses are sequentially jumped by x addresses. Each time one line image data has been inputted (step S3), the address S is incremented by 1 (step S4) to start inputting the next line image (step S2). The above operations are repeated until one page is completely inputted (step S5). As shown in FIG. 5, n-bit words are stored in the image memory in a chain of the line direction at consecutive addresses as shown in FIG. 5.

Next, the image data written in the image memory is column/line exchanged in units of n×n bits by the n×n column/line exchange circuit of the image memory controller 13.

Figure 7:
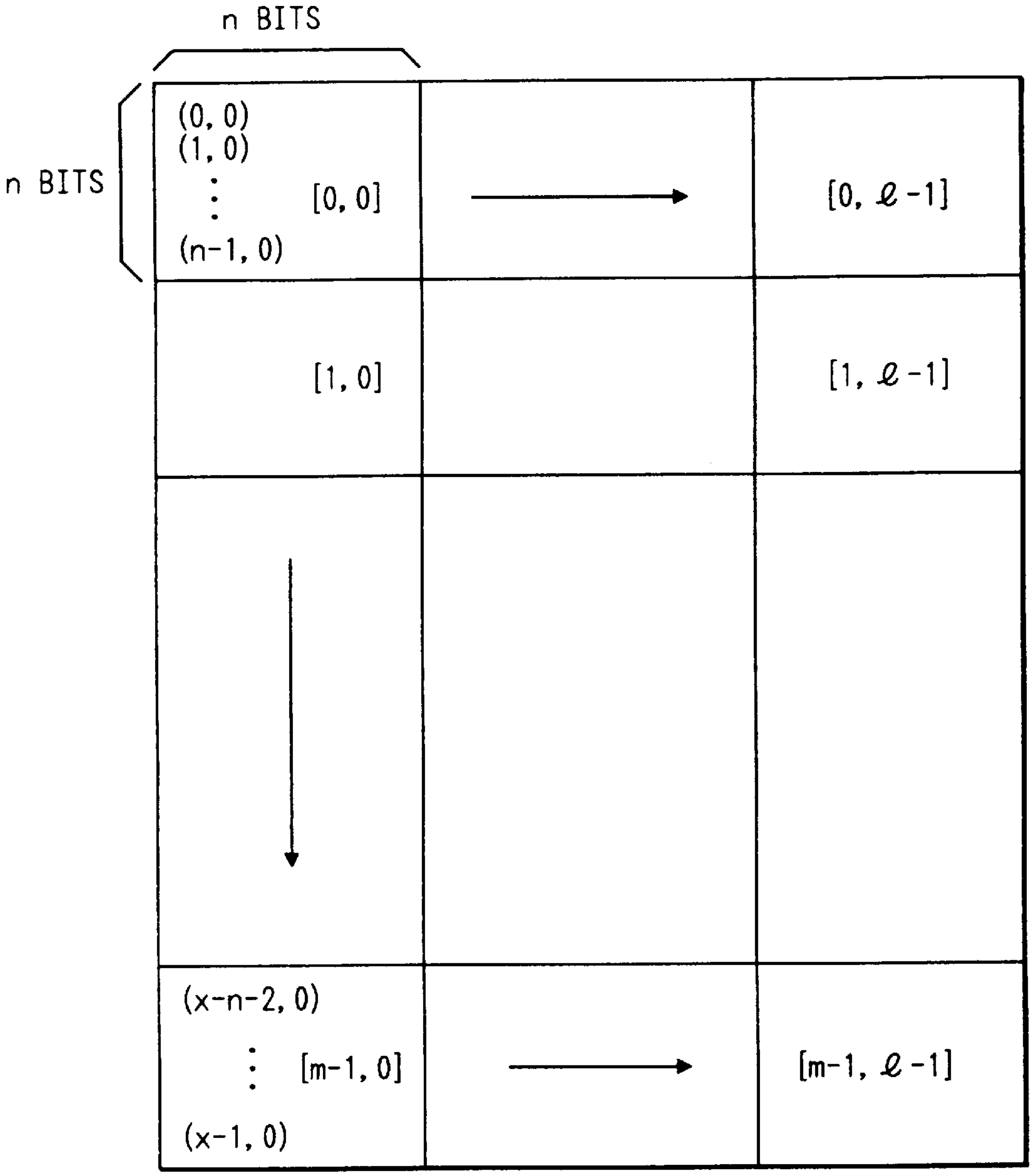
FIG. 7 is a schematic diagram showing data blocks each divided into n×n bits according to the first embodiment.

FIG. 7 shows the image memory storing the image data divided into blocks each being constructed of n×n bits. There are l×m blocks from [0, 0] to [m−1, l−1]. Lines and columns of each block are exchanged to perform n×n column/line exchange.

Figure 8:
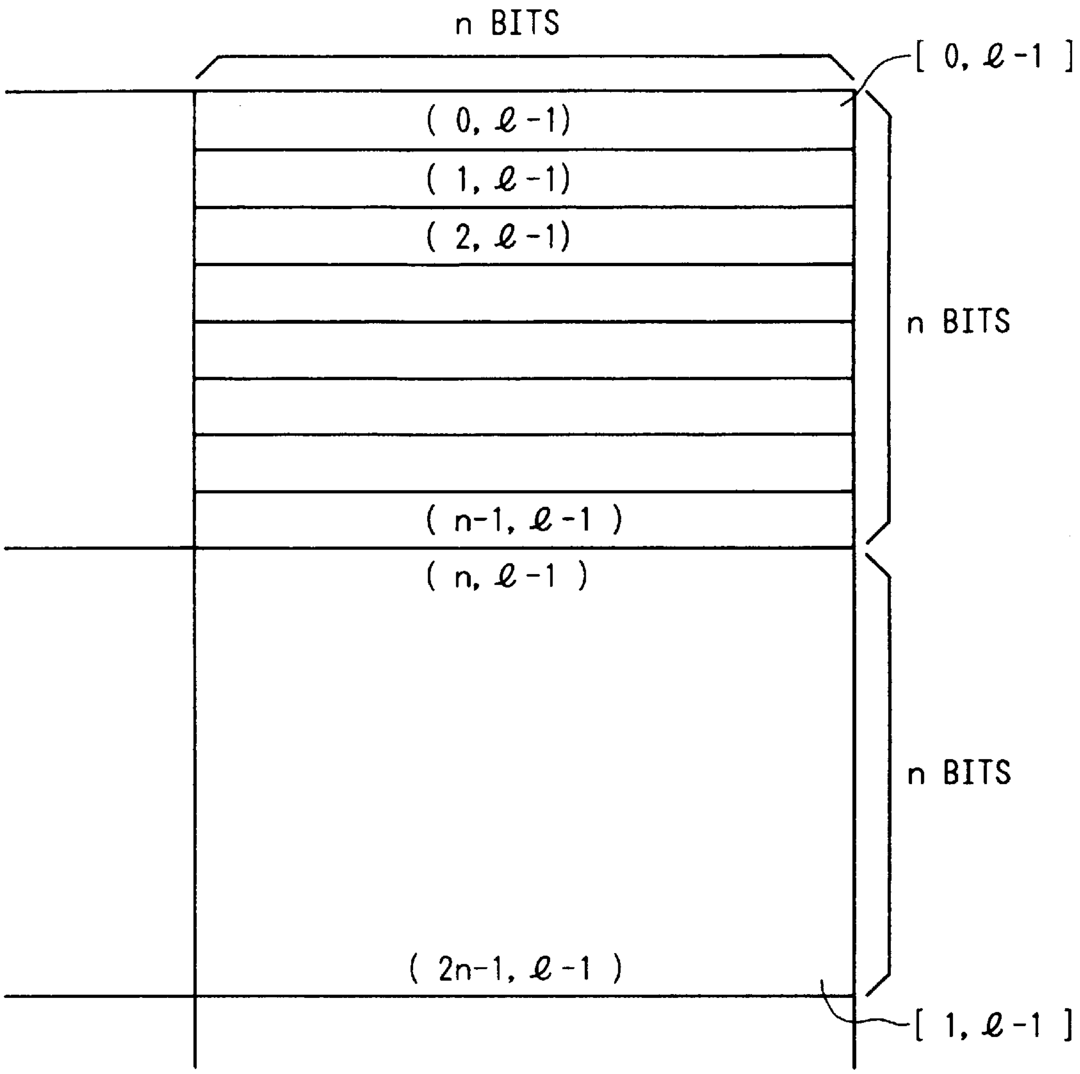
FIG. 8 is a schematic diagram showing image data and memory addresses prior to n×n exchange between lines and columns according to the first embodiment.
Figure 9:
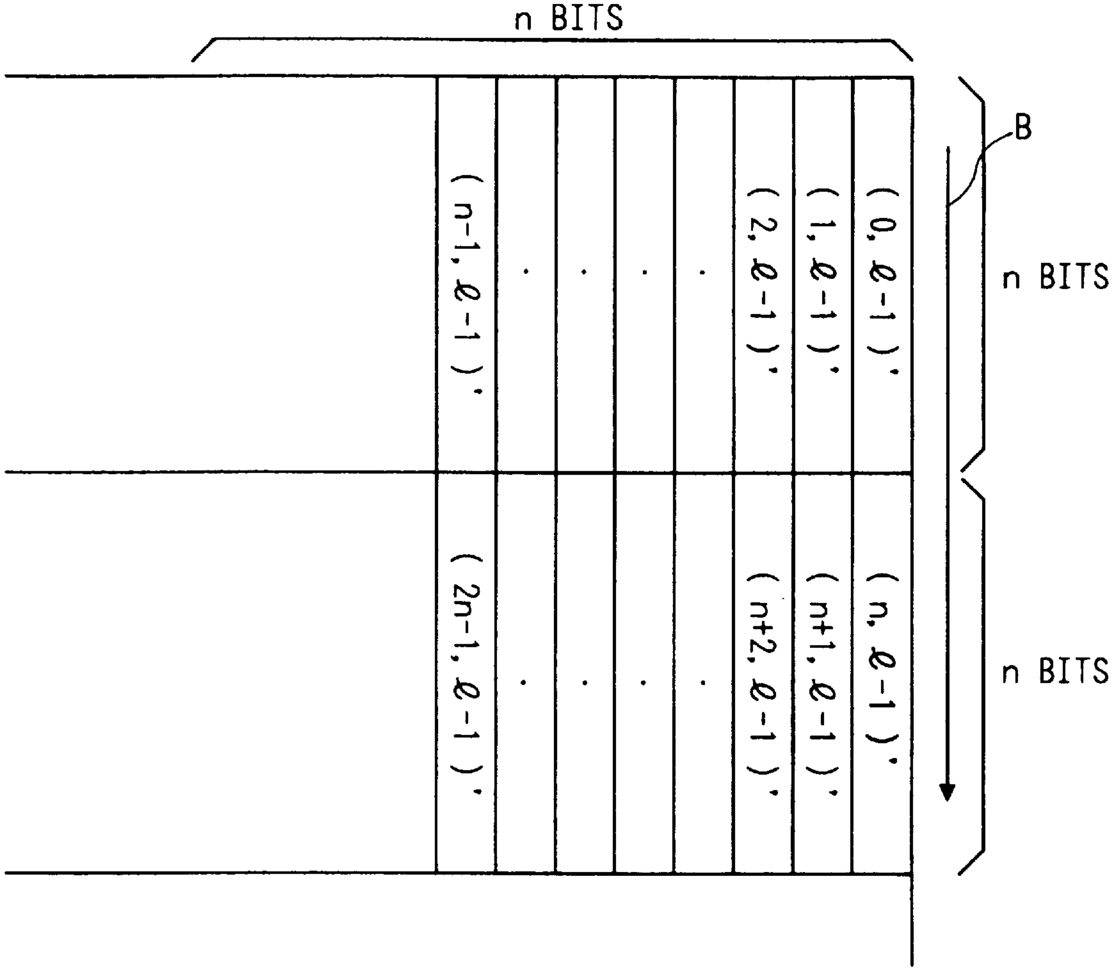
FIG. 9 is a schematic diagram showing image data and memory addresses after n×n exchange between lines and columns according to the first embodiment.

FIG. 8 is a schematic diagram showing the images and addresses of two blocks [0, l−1] and [1, l−1] before the n×n column/line exchange. FIG. 9 is a schematic diagram showing the images and addresses of the two blocks after the n×n column/line exchange.

In FIG. 9, it can be understood that the column/line exchanged image is obtained from consecutive data (0, l−1)', (n, l−1)', . . . in the direction indicated by arrow B.

Figure 10:
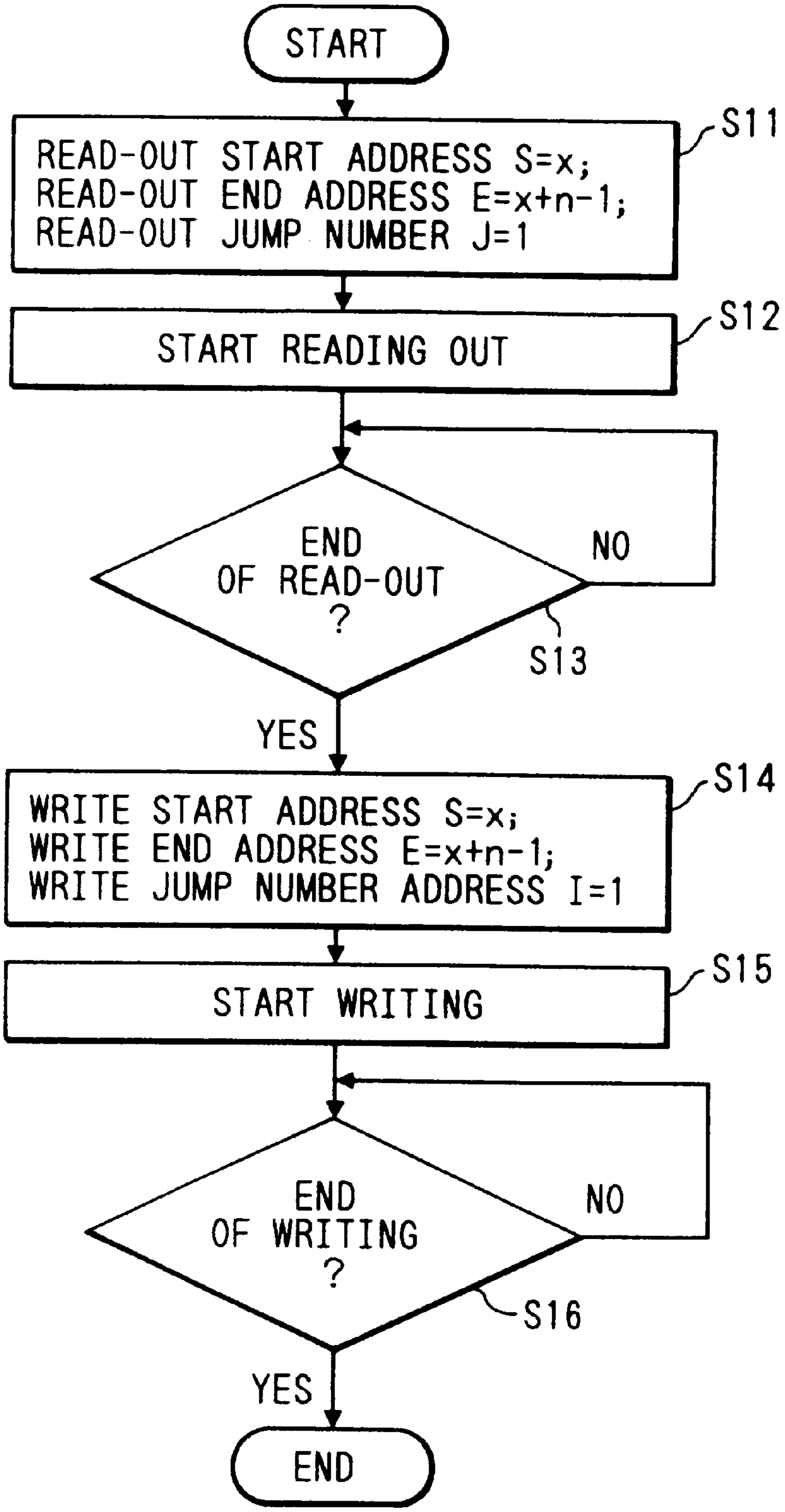
FIG. 10 is a flow chart illustrating the reading and writing operation at the time of n×n exchange between lines and columns according to the first embodiment.

FIG. 10 is a flow chart showing the image data read/write operation at the time of n×n column/line exchange.

First, there are set a read-out start address, read-out end address, and read-out jump number (step S11), to thereafter start reading an image data (steps S12, S13).

Next, there are set a write start address, write end address, and write jump number (step S14), to thereafter start writing an image data in a column/line exchanged state (steps S15, S16).

Figure 11:
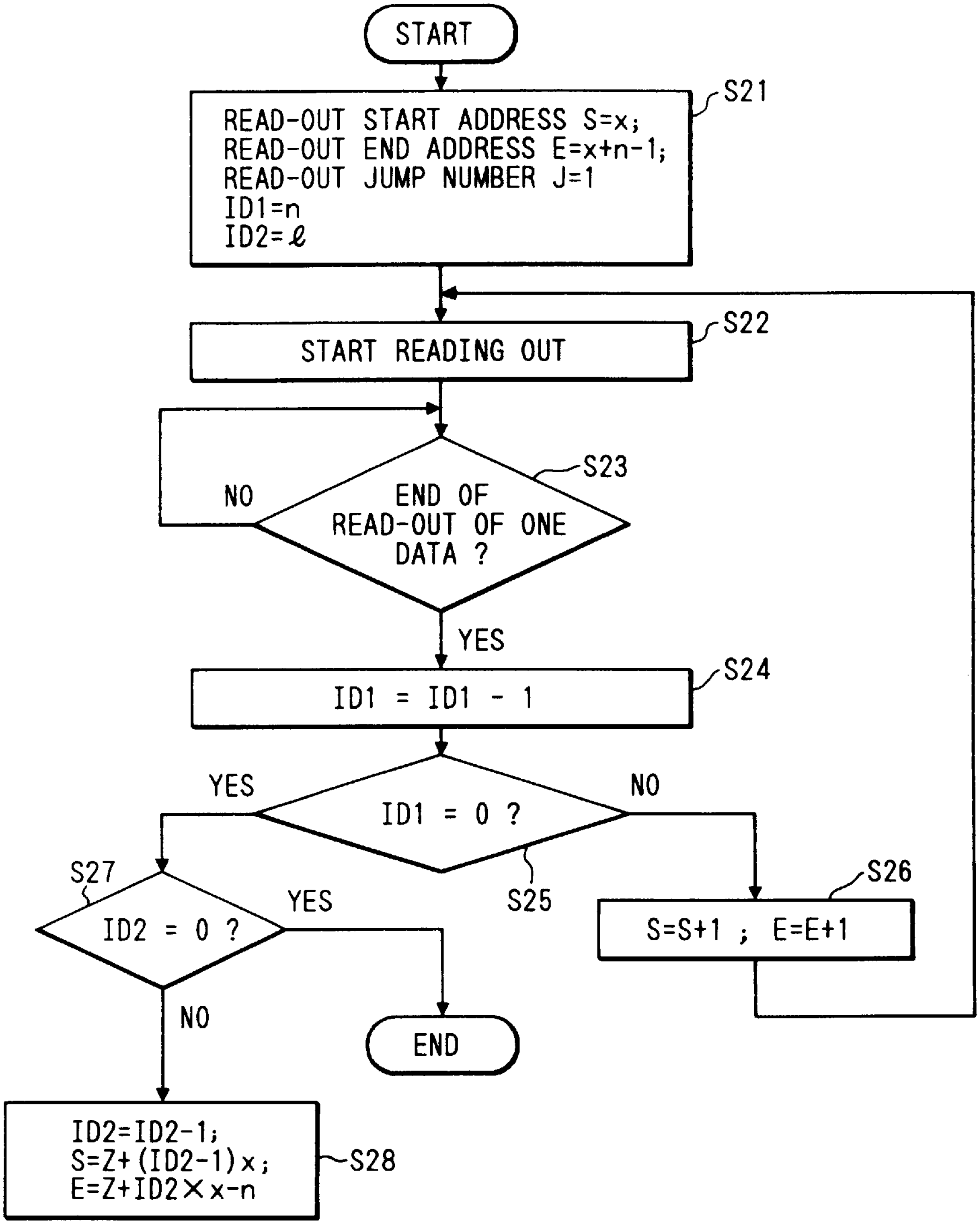
FIG. 11 is a flow chart showing a reading operation for a line/column exchanged one page image according to the first embodiment.

Since the image memory addresses are {z+(l−1) s}, {z+(l−1) x+n}, and {z+(l−1) x+2n}, the image memory addresses are controlled in the manner as shown in FIG. 11 to output the column/line exchanged image to the communication controller 14.

Specifically, there are first set the start address as {z+(l−1) x}, the end address as {z+lx−n}, and the jump number as n. As variables ID1 and ID2 indicative of the numbers of read-out data and lines, n and l are set (step S21).

Reading the image data starts (step S22). Each time one data is read (step S23), ID1 is incremented by 1 (step S24). If ID1 is not "0" (step S25), the start address and end address each are incremented by 1 (step S26).

If ID1 is "0" (step S25) and ID2 is not "0" (step S27), ID2 is decremented by 1, and the start address is set to {z+(ID2−1) x} and the end address is set to {z+ID2*x*−n} (step S28). The control then returns to step S22 to repeat the above read-out operation. The control terminates when ID2 becomes "0".

Figure 12:
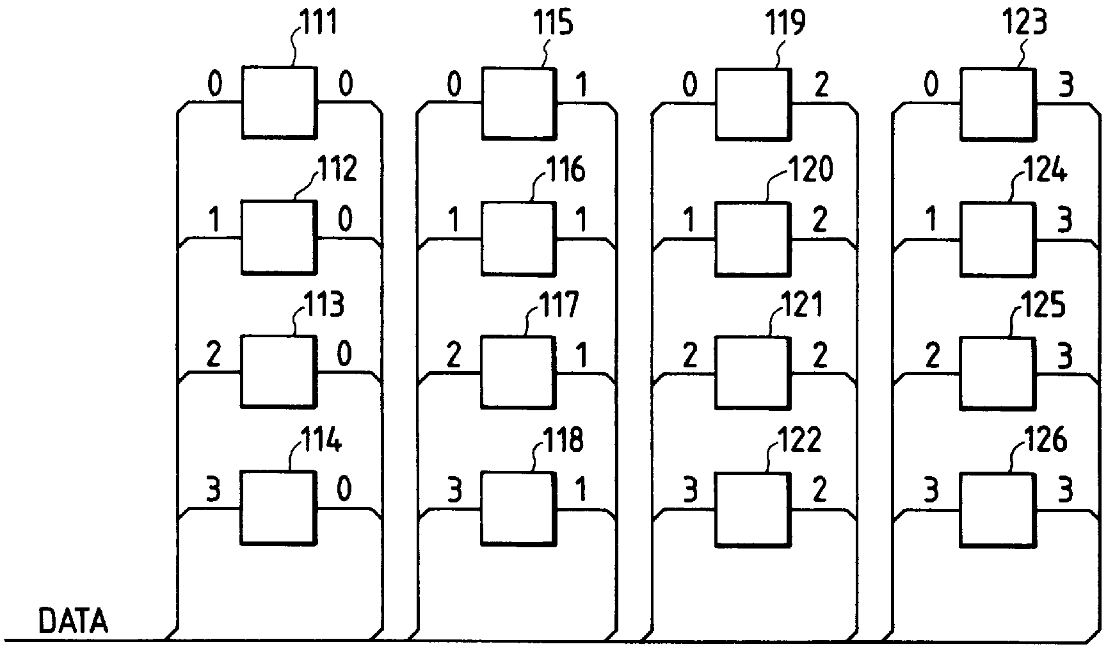
FIG. 12 is a block diagram showing an example of an n×n line/column exchanging circuit according to the first embodiment.

FIG. 12 shows the structure of the n×n column/line exchange circuit. This structure shows an example of 4×4 bits. As shown in FIG. 12, sixteen registers 111 to 126 are disposed in matrix and connected to the data base. For the 4×4 column/line exchange using the matrix registers 111 to 126, the data (111 to 114), (115 to 118), (119 to 122), and (123 to 126) are written in units of column, and the data (114, 118, 122, 126), (113, 117, 121, 125), (112, 116, 120, 124), and (111, 115, 119, 123) are read in units of line.

Figure 13:
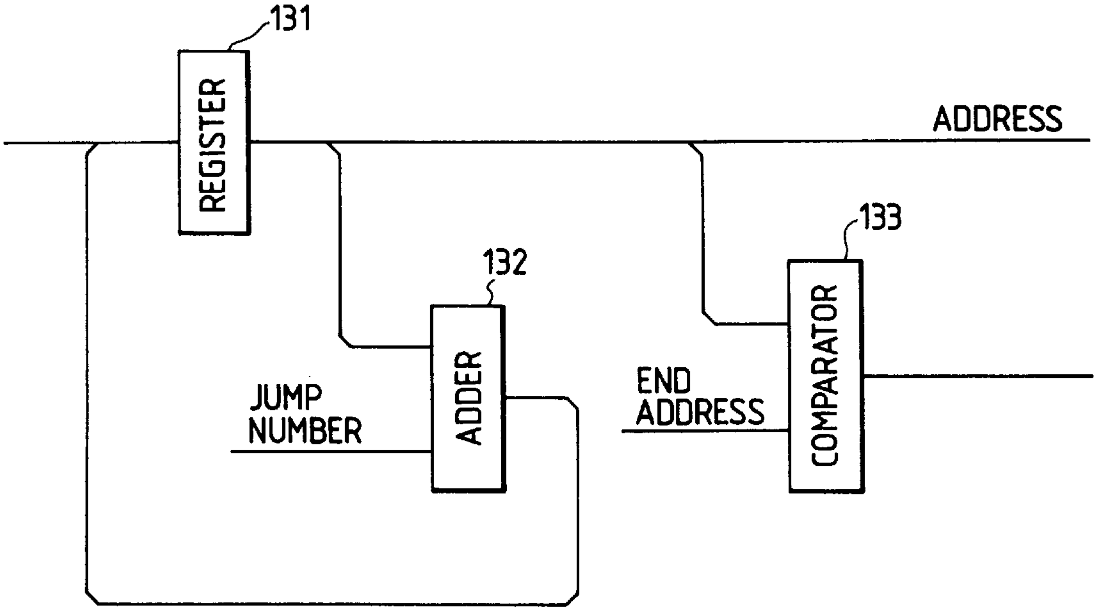
FIG. 13 is a circuit diagram showing the structure of an image memory controller according to the first embodiment.

FIG. 13 shows the structure of the image memory controller 13.

A read-out or write start address is stored in a register at first. The address outputted from the register 131 is incremented by the jump number at an adder 132 each time the image memory is accessed, and the updated address is again stored in the register 131. The updated address is compared with the end address at a comparator 133. If the memory address becomes coincident with the end address, a coincidence signal is issued.

The column/line exchange is realized in the above manner. In this embodiment, the column/line exchange is executed by setting y=(a length of a designated paper sheet in the main scan direction).

There will be described the processing for the case where the length of a read-out image data in the sub-scan direction is shorter or longer than the length of a designated paper sheet on the main scan direction.

Figure 14:
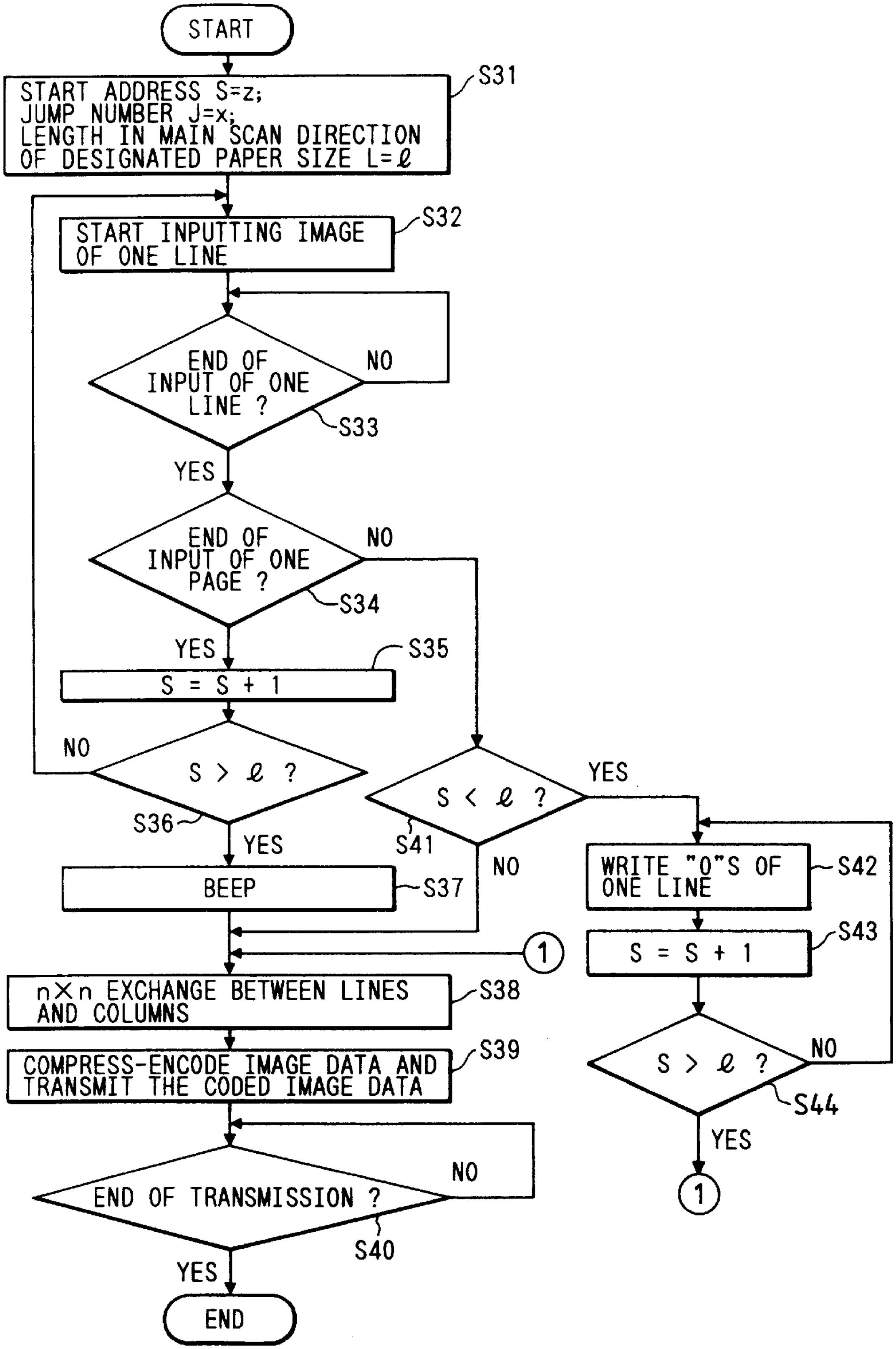
FIG. 14 is a flow chart illustrating the procedure which is executed when the length of the read-out image data in the sub-scan direction does not match the length of a designated paper size in the main scan direction.

FIG. 14 is a flow chart illustrating the control operation for the above case.

First, addresses and jump number are set (step S31) to start inputting an image data (step S32) and store it in the image memory in units of one line (step S33). The control unit 18 counts the number of lines (steps S34, S35). If the number of lines exceeds the number corresponding to the length of the designated paper sheet in the main scan direction (step S36), alarm sounds are generated from the loudspeaker 15 (step S37). Then, inputting an image data is terminated to execute the n×n column/line exchange by the image memory controller 13 (step S38). The image data is then read out to the communication controller 14 whereat it is compress-encoded for the transmission thereof (steps S39, S40).

If the number of lines is smaller than the number corresponding to the length of the designated paper sheet (step S41), the control unit 18 causes 0 data to be written for the empty portion of the designated paper sheet (step S42). Thereafter, the similar operations as above are executed to transmit the image data (steps S43, S44, S38 to S40).

In this case, instead of writing 0 data, the communication controller 14 may mask the image data at the time of compression-encoding to thereby realize white pixels of the empty portion of the image data.

As described above, in this embodiment, if the reading length of the handy scanner is short, the empty portion of the image data is made white data, thereby executing data transmission without waste. On the contrary if the reading length is long, the excessive portion is neglected and alarm sounds are generated to notify an operator of such a case.

Figure 15:
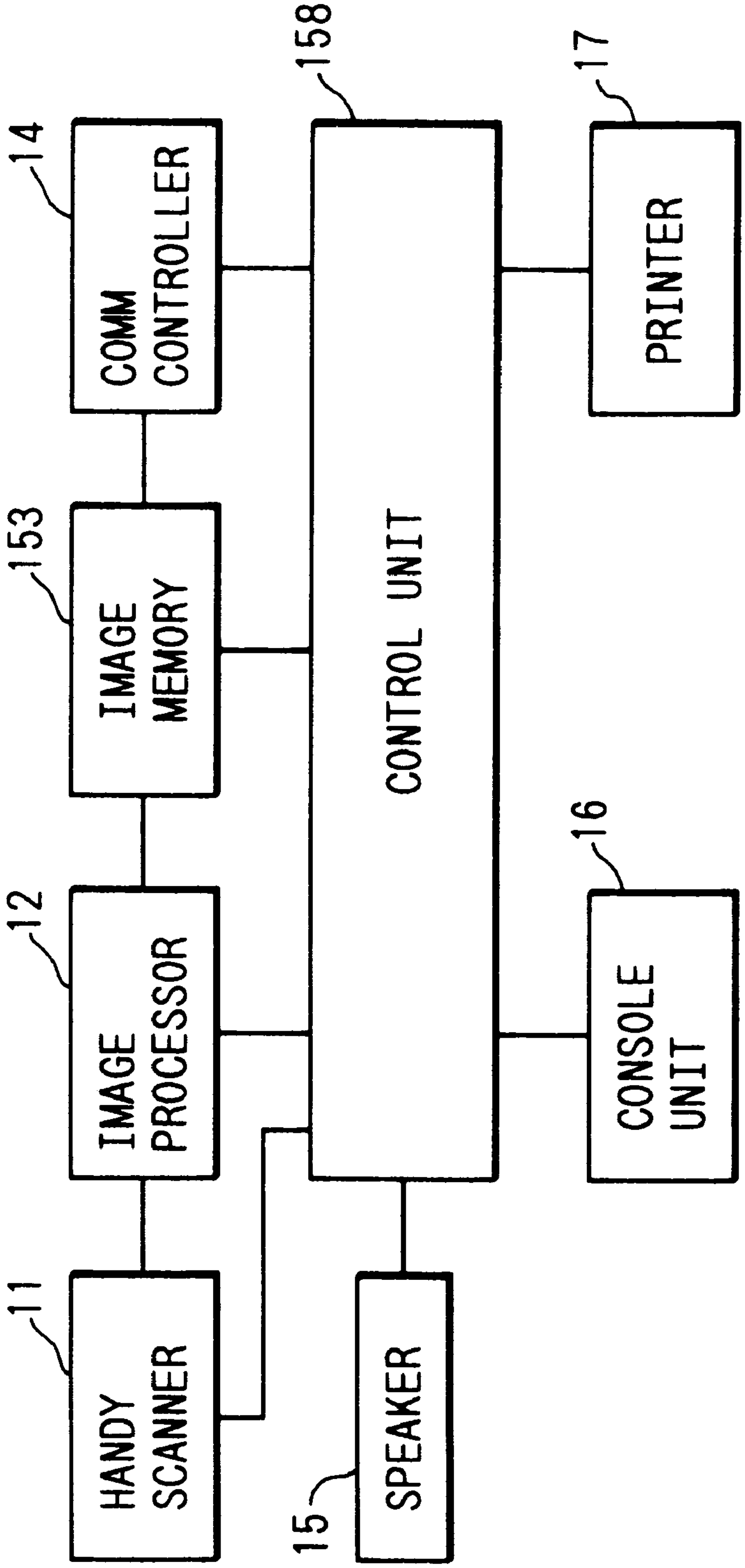
FIG. 15 is a block diagram showing the structure of a facsimile apparatus according to a second embodiment of this invention.

FIG. 15 is a block diagram showing the second embodiment of this invention.

As shown in FIG. 15, it is possible that an image data stored in an image memory 153 is column/line exchanged and compression-encoded to transmit it under control of the microcomputer of an control unit 158. The other structure is the same as the first embodiment and the description therefor is omitted merely by giving identical reference numerals to those elements similar to those in FIG. 1.

According to the first and second embodiments, an image data of an image having a longer vertical side read with a small handy scanner in a main scan direction is column/line exchanged and transmitted basing on the length of a designated paper sheet in the main scan direction. Accordingly, wasteful use of paper sheets can be avoided, and transmission time and communication cost can be reduced.

Next, there will be described the third embodiment wherein a plurality of pages are recorded on a single recording sheet (cut sheet).

Figure 16:
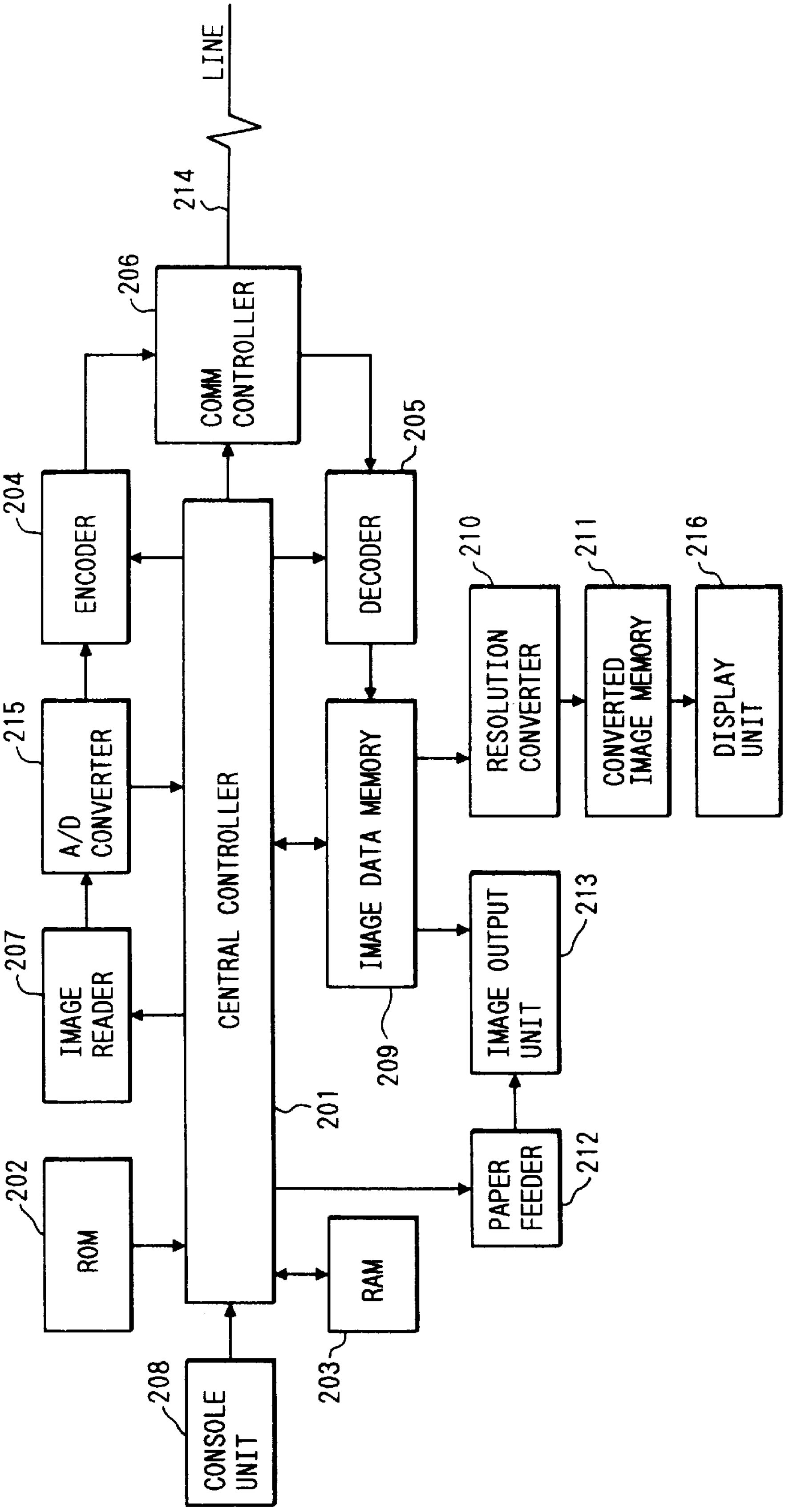
FIG. 16 is a block diagram showing the structure of a facsimile apparatus according another embodiment of this invention.

FIG. 16 is a block diagram showing the structure of a facsimile apparatus of the third embodiment.

In FIG. 16, a central controller 201 controls all operations of the facsimile apparatus. Programs for the control operation of the central controller 201 are stored in a ROM 202. A RAM 203 temporarily stores control data and the like. A console unit 208 is used for transmitting an image data, requesting for displaying an image data, and other operations.

In transmitting an image data, an image is optically read with an image reader 207, photoelectrically converted with a CCD or the like, and binarized by an A/D converter 215. The binarized image data is encoded by an encoder 204 into a signal suitable for transmission such as an MMR, MR, or MH signal according to CCITT Recommendation, and transmitted via a communication controller 206 to a communication line 214. In receiving an image data, an image data from the line 214 is sent via the communication controller 206 to a decoder 205 whereat it is decoded into a signal having a format suitable for digital processing. The decoded data is stored in an image data memory 209 constructed of semiconductor memories and the like.

The data stored in the image data memory 209 is processed in the following manner depending upon the resolution of a display unit 216. Specifically, a resolution converter 210 sequentially reads data stored in the image data memory 209, converts its resolution so as to match the resolution of the display unit 216 constructed of a CRT, liquid crystal display or the like. The image data with a converted resolution is stored in a converted image memory. Each time a request for displaying an image data, an image data stored in the converted image memory 211 is outputted to the display unit 216.

An image output unit 213 is constructed of a laser printer, a thermal printer, or a bubble jet printer which ejects ink by generating a bubble with heat. When a request for displaying an image data, the image output unit 213 receives an image data from the communication controller 206, or receives an image data read with the image reader 207, A/D converted by the A/D converter 215, and read from the image data memory 209 without being subjected to the resolution conversion. At the same time, a paper feeder 212 receives an instruction from the central controller 201 to feed a recording sheet to the image output unit 213 to thereby display an image having a resolution at the time of image data reception or at the time of image data reading with the image reader 207.

Figure 17A:
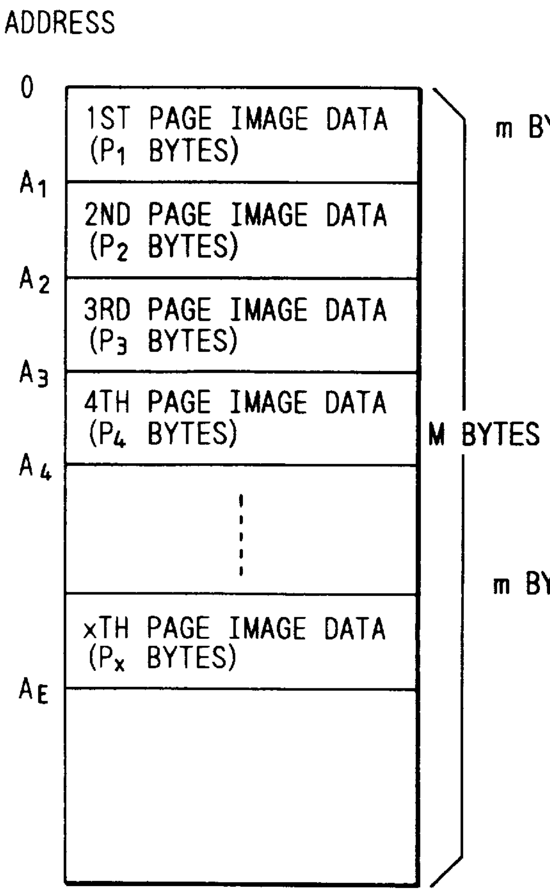
FIG. 17A is a view showing arragement of the image data memory.
Figure 17B:
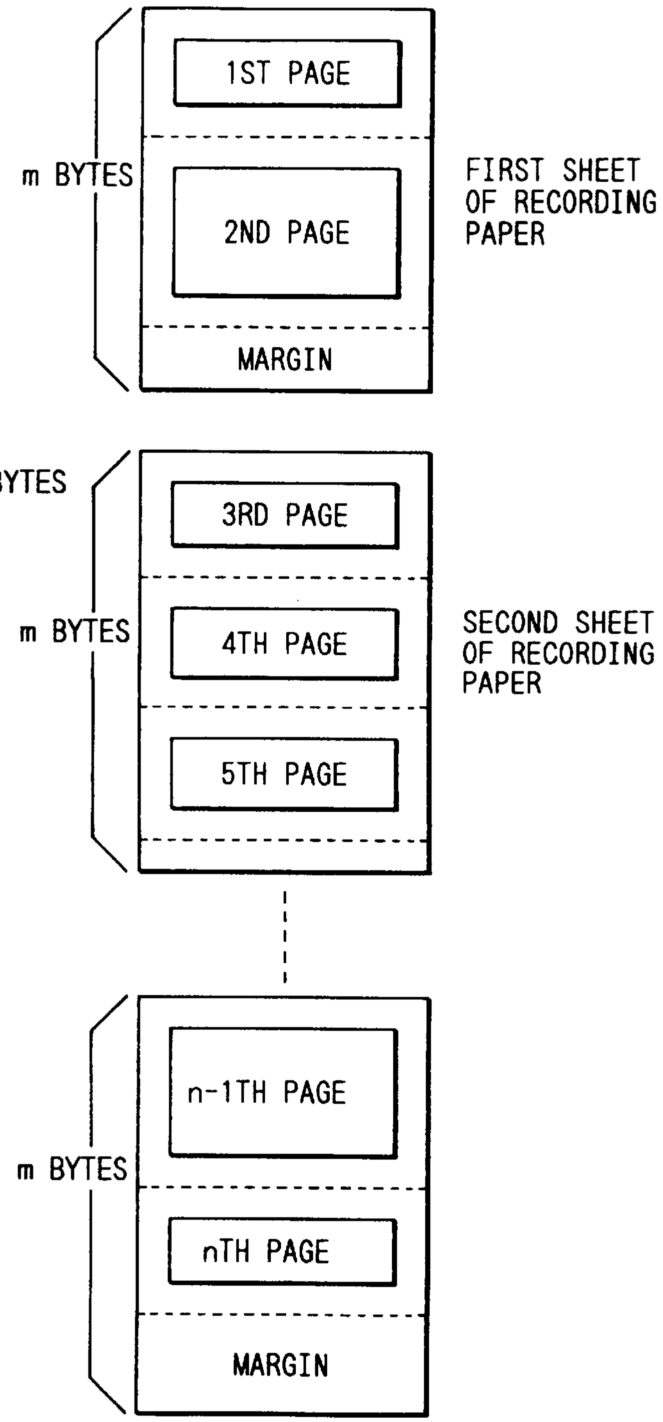
FIG. 17B is a diagram showing the relation between pages and a display output format on a recording sheet.

FIG. 17A shows the structure of the image data memory 209. Image data are designated by addresses shown in FIG. 17, respectively. Each image data having Pn (n is a page number) bytes is stored as the first to x-th pages in the image data memory 209 having M byte image data in total. FIG. 17B shows the relation between a display format on a recording sheet and a page.

As shown in FIG. 17B, each recording sheet is arranged to be capable of recording m byte image data (the value m changes with the size of a recording sheet). To this end, the central controller 201 shown in FIG. 16 performs the following calculations for displaying an image data.

Specifically, for displaying an image data on a first recording sheet shown in FIG. 17B, the byte numbers of an image data is calculated from the addresses of the image data stored in the image data memory. The byte numbers are added together. For example, if the results are:

$$P1+P2<m,$$

and $$P1+P2+P3>m,$$

the first and second pages only are recorded on the first recording sheet. Similarly, if the results are:

$$P3+P4+P5>m,$$

and $$P3+P4+P5+P6>m$$

the third to fourth pages are recorded on the second recording sheet. Namely, image data sufficing the condition of $P_n+P_{n+1}+P_{n+2}+\ldots \leqq m$ (n is the page number) is recorded on a single recording sheet. The blank portion of a recording sheet is therefore made minimum while recording the maximum number of pages. As shown in FIG. 17B, a separation line (a broken line in FIG. 17B) is drawn on a recording sheet for indicating a partition between pages.

Next, with reference to the flow chart of FIG. 18, there will be described the procedure to be carried out by the facsimile apparatus of this embodiment for displaying (recording) an image data in the image data memory on a recording sheet.

Upon a request of displaying an image data of the first to x pages stored in the image data memory at step S201, there are set at step S202 a start address As (address 0 in this embodiment) and an end address Ae. Next at step S203 the output capacity (byte number) of a single recording sheet is recognized in accordance with the information of a recording sheet within the paper feeder.

At step S204 the byte number (P) is calculated from the addresses of display requested pages. At step S205 the number of pages capable of being recorded on a single recording sheet is obtained from the byte number. Specifically, the maximum value n satisfying $\Sigma\ Pn \leqq m$ is obtained, the value n corresponding to the maximum pages capable of being recorded on a single recording sheet. At step S206 an image data for one page is displayed. At the next step S207, a separation line is displayed.

At step S208, it is checked if an image data for one page has been displayed or not. If not, the control returns to step S206 to display the next page image data. If an image data for one page has been displayed, it is checked at step S209 whether or not the address An of the page last displayed is the end address $A_E$. If not, the control returns to step S204 to display an image data for the next recording sheet. If both the addresses are equal to each other, it means that the image data of all requested pages has been displayed so that the control is terminate.

Figure 19:
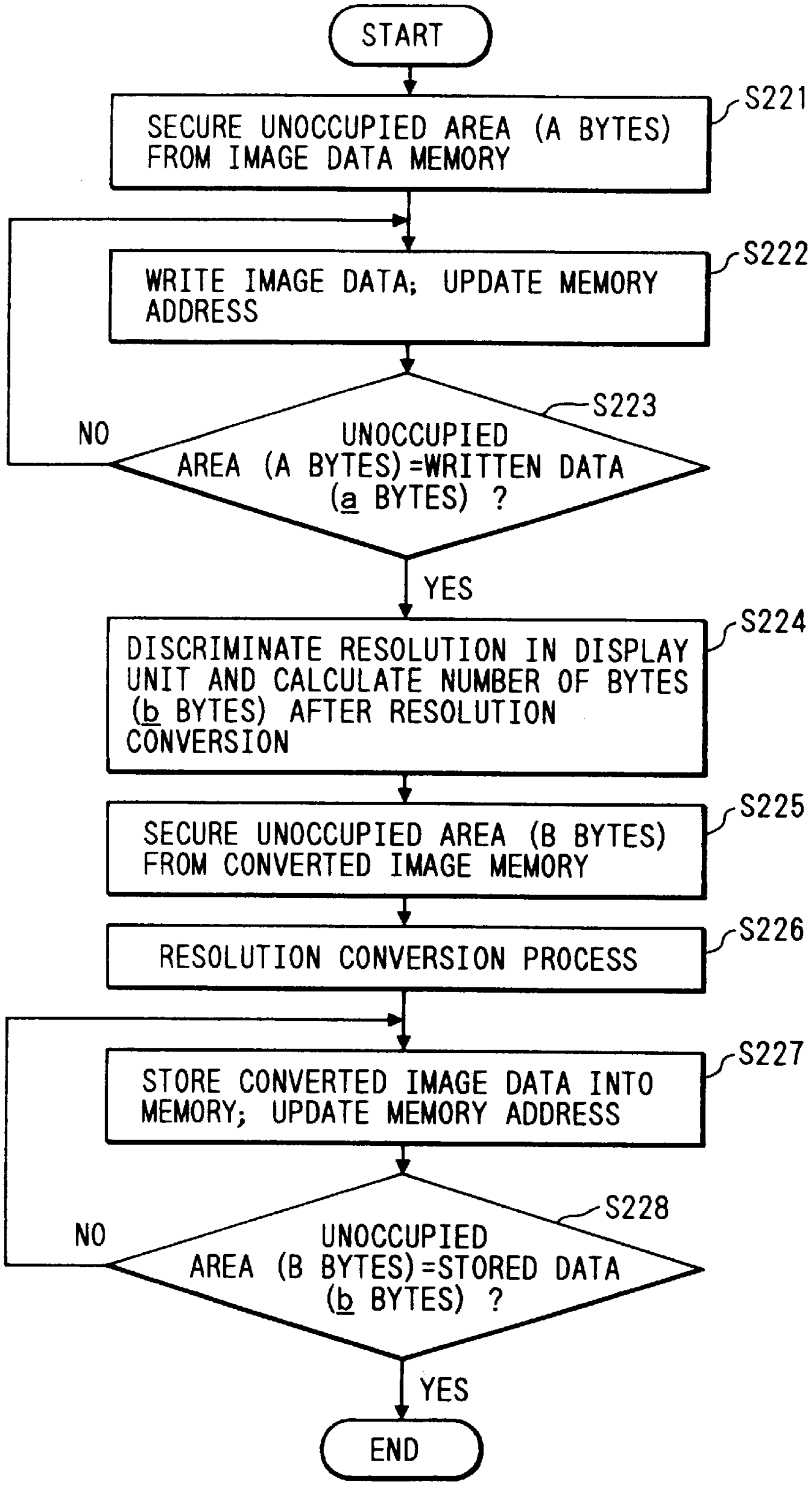
FIG. 19 is a flow chart illustrating the control procedure wherein the resolution of image data is converted and thereafter the image data is stored.

FIG. 19 is a flow chart illustrating the procedure to be carried out by the facsimile apparatus of this embodiment for converting the resolution of image information received from the communication line or read with the image reader and storing the resolution converted image information in the image data memory.

In FIG. 19, at step S221 an empty area (A bytes) of the image data memory are reserved for the image data from the communication controller and decoder or for the image data from the image reader and A/D converter. At step S222 actual write operation and memory address updating are executed. At step S223 the write data amount (a bytes) is compared with the empty area (A bytes) of the image data memory. If they are not equal, it means that the write operation is not still completed, so the control returns to step S222. If they are equal, it means that the write operation has been completed, so at step 224 the resolution of the display unit is checked to calculate the byte number (b bytes) after the resolution conversion.

An empty area (B bytes) of the converted image memory after the resolution conversion is reserved at step S225. At step S226, the resolution conversion is executed. The resolution converted image data is stored in the converted image memory at step S227, and at the same time the memory addresses are updated. If the empty area (B bytes) of the converted image memory becomes equal to the written byte number at step S228 after the memory address updating, it means that the converted image has been fully stored. If not, the control returns to step S227 to continue storing the image data.

Figure 20:
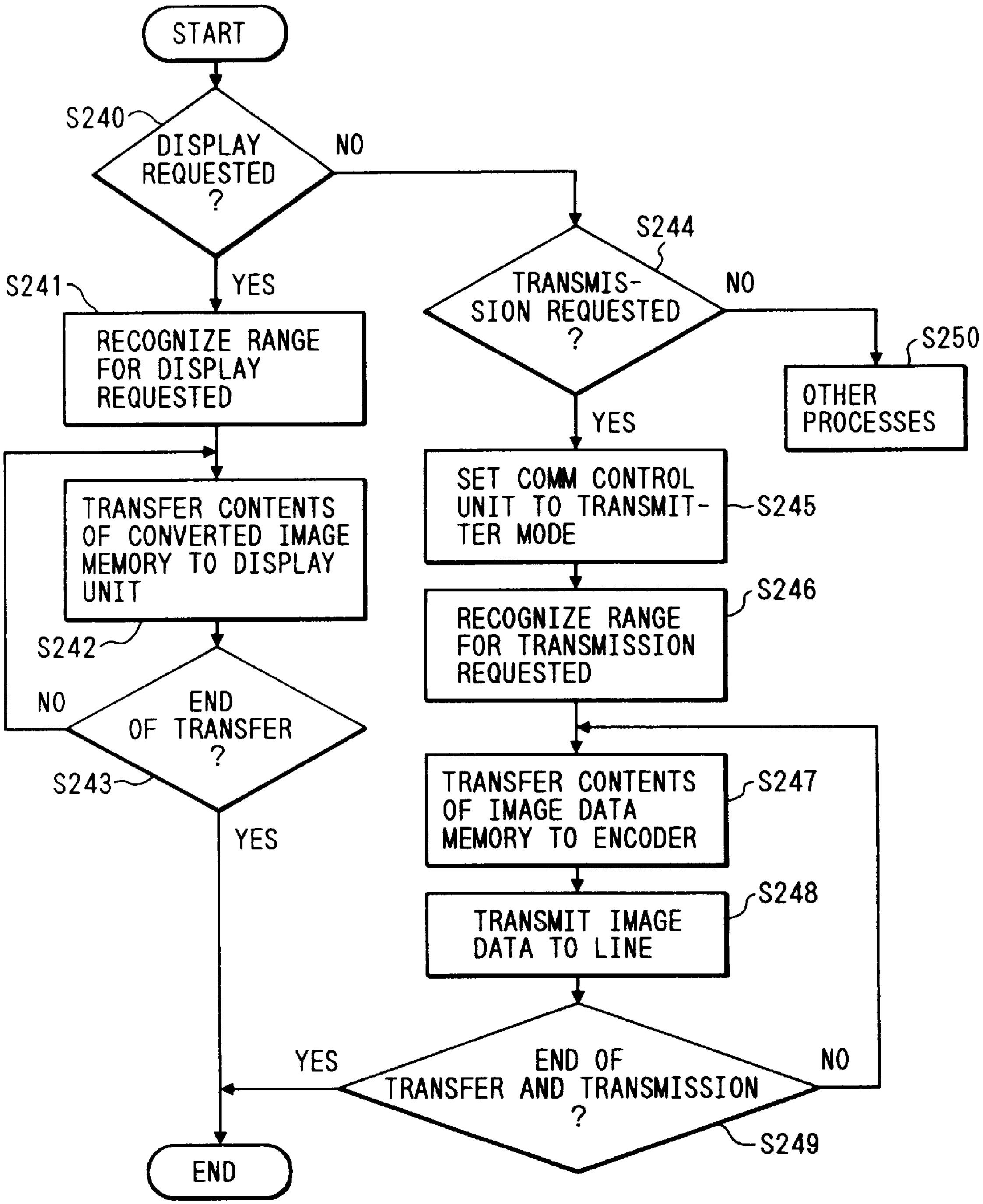
FIG. 20 is a flow chart illustrating the control procedure wherein image data is outputted, displayed, and transmitted to a communication line.

FIG. 20 is a flow chart illustrating the procedure to be carried out by the facsimile apparatus of this embodiment for transmitting an image data to the line.

Upon a request for displaying an image data on the display unit at step S240 in FIG. 20, the display request range of an image data within the converted image memory is checked at step S241. At step S242 the image data within the request range stored in the converted image memory is sequentially transferred to the display unit. It is checked at step S243 whether or not the image data within the request range has been transferred. If the data transfer has been completed, the control returns to step S242 to continue the data transfer operation.

Upon a request for transmitting image data to the line at step S244, the communication controller is set to a transmission mode at step S245. The transmission request range of image data within the image data memory is checked at step S246. At the next step S247 the contents of the image data memory are sequentially sent to the encoder. At step S248 the communication controller transmits the image data to the line. Completion of sending and transmitting the image data is checked at step S249. If not completed at yet, the control returns to steps S247 and S248 to continue the transmission procedure.

If there is not display request and transmission request respectively at steps S240 and S244, then other processes are executed at step S250.

As described above, according to the embodiment, it is possible to sequentially display and output plural pages of images on a single recording paper at a received and so that an operator who uses a facsimile machine having small capacity for one communication can avoid a waste of recording papers. In particular, as seen from FIG. 17B, as compared with a conventional apparatus which requires n sheets of recording papers to record n pages, the present invention can cut down papers to be required very much.

Also, whether a cut paper at a roll paper is used, the present invention provides the advantage of protection from confusion or misunderstanding of communicated contents because ruled lines are formed to separate each of plural displayed and outputted images at the last page.

Further, two types of resolution for one image data are prepared to match resolution of a display unit of an image output unit so that it is not required to execute resolution conversion so as the display data on a low resolution display unit. Also, since there is small amount of data to be processed, a time required to transfer data is short, high speed data retrieval is realized, and quick data editor is attained even when a low resolution display unit is used.

Furthermore, as for the output or transmission of a high resolution image, high resolution image data is directly read out from a storage and processed without resolution conversion.

As described above, according to the third embodiment it is possible to record images of a plurality of pages on a single recording sheet while allowing to readily discriminate separations between pages, and to search stored image data at high speed.

In the above embodiments, a facsimile apparatus has been described by way of example. The present invention can be applied not only to facsimile apparatuses but also other various data communication apparatuses such as telex machines.

The present invention is not limited only to the above embodiments, but various modifications are possible.

I claim:

1. A data communication apparatus comprising:

means for receiving image data representing images of a plurality of pages;

means for storing the received image data;

means for recording the stored image data on a recording sheet of a predetermined size; and control means for controlling said recording means to record the received images of a plurality of pages on a single recording sheet, wherein said control means determines a number of pages of the stored image data to be recorded on said single recording sheet by comparing a data amount of a sum of a desired number of pages of the stored image data with a data amount recordable in said single recording sheet, and said control means controls said recording means to record the desired number of pages on said single recording sheet when the data amount of the sum of the desired number of pages is not more than the data amount recordable in said single recording sheet and a data amount of the sum of said desired number of pages plus one page exceeds the data amount recordable on said single recording sheet.

2. A data communication apparatus according to claim 1, wherein said control means controls said recording means to record information indicating a separation between pages of received images of a plurality of pages recorded on said single recording sheet.

3. A data communication apparatus according to claim 1, further comprising:

means for displaying the stored image data;

means for converting a resolution of the stored image data into a resolution for input to an image data display; and means for storing image data having a resolution converted by said converting means.

4. A data communication method comprising the steps of:

receiving image data representing images of a plurality of pages;

storing the received image data;

recording the stored image data on a recording sheet of a predetermined size; and controlling the recording step to record the received images of a plurality of pages on a single recording sheet including determining a number of pages of the stored image data to be recorded on a single recording sheet by comparing a data amount of a sum of a desired number of pages of the stored image data with a data amount recordable in the single recording sheet and recording the desired number of pages on the single recording sheet when the data amount of the sum of the desired number of pages is not more than the data amount recordable in the single recording sheet and a data amount of the sum of the desired number of pages plus one page exceeds the data amount recordable on the single recording sheet.

5. A data communication method according to claim 4, wherein said controlling step controls said recording step to record information indicating a separation between pages recorded on said single recording sheet.

6. A data communication method according to claim 4, further comprising the steps of:

displaying the stored image data;

converting a resolution of the stored image data into a resolution for input to an image data display to provide converted image data; and storing the converted image data.

7. A data communication apparatus comprising:

recording means for recording data on recording paper;

identifying means for identifying a size of data of a plurality of pages;

determining means for determining a number of pages of the data to be recorded by said recording means on one sheet of the recording paper on the basis of the sum obtained by adding sizes of data of a plurality of pages in page order; and control means for controlling said recording means to record the determined number of pages of the data on the one sheet of the recording paper, wherein said determining means determines the number of pages of the data to be recorded on the one sheet of recording paper such that a size of the number of pages is smaller than a size of the one sheet of recording paper and such that a size of the number of pages plus one more page is larger than the size of the one sheet of recording paper.

8. An apparatus according to claim 7, wherein the data is image data received from a remote location.

9. An apparatus according to claim 7, wherein the one sheet of recording paper is a cut sheet of predetermined size.

10. An apparatus according to claim 7, wherein said identifying means identifies the size of the data on the basis of a data amount of the data.

11. An apparatus according to claim 7, further comprising storing means for storing the data prior to recording.

12. An apparatus according to claim 7, wherein said identifying means detects a data amount of the data using an address of the data in said storing means, and identifies the size of the data on the basis of the detected data amount.

13. An apparatus according to claim 7, wherein said determining means detects a size of the one sheet of recording paper on the basis of information set in said recording means, and determines the number of pages of the data to be recorded on the one sheet of recording paper based on the detected size of the one sheet of recording paper.

14. An apparatus according to claim 7, wherein said control means causes said recording means to record an image representing a partition on the one sheet of recording paper between each two adjacent pages of the data as recorded.

15. An apparatus according to claim 7, wherein the data is image data obtained by reading an original document.

16. An apparatus according to claim 7, wherein said data communication apparatus is a facsimile apparatus.

17. An apparatus according to claim 7, wherein the data is image data.

18. A data communication method comprising the steps of:

recording data on recording paper;

identifying a size of data of a plurality of pages;

determining a number of pages of the data to be recorded in said recording step on one sheet of the recording paper on the basis of the sum obtained by adding sizes of data of a plurality of pages in page order; and controlling said recording step to record the determined number of pages of the data on the one sheet of the recording paper, wherein said determining step determines the number of pages of the data to be recorded on the one sheet of recording paper such that a size of the number of pages is smaller than a size of the one sheet of recording paper and such that a size of the number of pages plus one more page is larger than the size of the one sheet of recording paper.

19. A method according to claim 18, wherein the data is image data received from a remote location.

20. A method according to claim 18, wherein the one sheet of recording paper is a cut sheet of predetermined size.

21. A method according to claim 18, wherein said identifying step identifies the size of the data on the basis of a data amount of the data.

22. A method according to claim 18, further comprising storing step of storing the data in a storage device prior to recording.

23. A method according to claim 18, wherein said identifying step detects a data amount of the data using an address of the data in the storage device, and identifies the size of the data on the basis of the detected data amount.

24. A method according to claim 18, wherein said determining step detects a size of the one sheet of recording paper on the basis of information set for use in said recording step, and determines the number of pages of the data to be recorded on the one sheet of recording paper based on the detected size of the one sheet of recording paper.

25. A method according to claim 18, wherein said control step causes said recording step to record an image representing a partition on the one sheet of recording paper between each two adjacent pages of the data as recorded.

26. A method according to claim 18, wherein the data is image data obtained by reading an original document.

27. A method according to claim 18, wherein the data communication method is a facsimile method.

28. A method according to claim 18, wherein the data is image data.

* * * * *

UNITED STATES PATENT AND TRADEMARK OFFICE

CERTIFICATE OF CORRECTION

PATENT NO. : 6,115,543
DATED : September 5, 2000
INVENTOR(S) : Yukio Murata

It is certified that error appears in the above-identified patent and that said Letters Patent is hereby corrected as shown below:

Please delete columns 1-12 and substitute therefor columns 1-12.

Signed and Sealed this

Sixth Day of May, 2003

JAMES E. ROGAN
*Director of the United States Patent and Trademark Office*

DATA COMMUNICATIONS APPARATUS WHICH GROUPS RECEIVED PAGES FOR PRINTING TO SHEETS

This application is a continuation of application Ser. No. 07/607,656 filed Oct. 31. 1990 now abandoned.

BACKGROUND OF THE INVENTION

1. Field of the Invention

The present invention relates to a data communication apparatus capable of sending and receiving image data of irregular size.

2. Related Background Art

As apparatuses of this type, facsimile apparatuses are known. Facsimile apparatuses for sending and receiving image data through a telephone line or a digital network have been recently used widely in companies and homes.

Most facsimile apparatuses transmit an original of a regular size determined by CCITT Recommendations. For example, if an original to be transmitted is A4 size and it is read at a reading resolution of 8×7.7 pel/mm, the original is read one line after another in units of 1728 bits in the main scan direction and thereafter it is transmitted.

As facsimile apparatuses are used more and more in homes, it can be expected that a handy scanner of a small size and low cost will be used as an image reader. The length in the main scan direction read with a small handy scanner is considerably smaller than the regular image data size (e.g., A4 paper size and 1728 bits at resolution of 8×7.7 ppi) determined by CCITT Recommendations.

Most facsimile apparatuses presently available in markets have as their recording paper sheets only roll-type regular size paper sheets. Accordingly, if image data-read with a small handy scanner is transmitted as a regular size image with the blank bit portion being transmitted as white, a wasteful large blank portion is received at a receiving side.

Furthermore, with respect to facsimile apparatuses having a function to store a large capacity of transmitted or received images, each time stored image data is read out for search by scroll using a display unit the resolution of the image data is converted into so as to match the resolution of the display unit.

Since the stored image data is converted and outputted to match the resolution of the display unit when a request of displaying the image data is instructed, it takes a lot of time to read out the image data and convert the resolution. Therefore, speeding up of such processes requires a large scale of hardware so that there is a limit in speeding up.

The technique regarding transmission of an irregular size image data is disclosed in U.S. Pat. No. 4,712,139 and U.S. patent application Ser. No. 049,948 filed on Mar. 29, 1988, abandoned. However, the technique for solving the above is not known as yet.

SUMMARY OF THE INVENTION

Considering the above problems, the present invention aims at improving a data communication apparatus.

It is another object of this invention to provide a data communication apparatus capable of efficiently recording an image.

It is a further object of this invention to provide a data communication apparatus capable of recording an image of an irregular size.

It is a still further object of this invention to provide a data communication apparatus capable of recording images of a plurality of sheets on a single sheet of paper.

It is another object of this invention to provide a data communication apparatus capable of storing image data and searching a display image at high speed.

The above and other objects of this invention will become apparent from the following detailed description of embodiments when read in connection with the accompanying drawings.

BRIEF DESCRIPTION OF THE DRAWINGS

FIG. 1 is a block diagram showing the structure of a facsimile apparatus according to a first embodiment of this invention.

FIG. 2 is a plan view illustrating the reading operation by a handy scanner according to the first embodiment.

FIG. 3 is a schematic diagram showing a bit map of image data according to the first embodiment.

FIG. 4 is a timing chart showing writing image data and memory addresses according to the first embodiment.

FIG. 5 is a schematic diagram showing a memory map how data is written according to the first embodiment.

FIG. 6 is a flow chart illustrating image data writing operation according to the first embodiment.

FIG. 7 is a schematic diagram showing data blocks each divided into n×n bits according to the first embodiment.

FIG. 8 is a schematic diagram showing image data and memory addresses prior to n×n exchange between lines and columns according to the first embodiment.

FIG. 9 is a schematic diagram showing image data and memory addresses after n×n exchange between lines and columns according to the first embodiment.

FIG. 10 is a flow chart illustrating the reading and writing operation at the time of n×n exchange between lines and columns according to the first embodiment.

FIG. 11 is a flow chart showing a reading operation for a line/column exchanged one page image according to the first embodiment.

FIG. 12 is a block diagram showing an example of an n×n line/column exchanging circuit according to the first embodiment.

FIG. 13 is a circuit diagram showing the structure of an image memory controller according to the first embodiment.

FIG. 14 is a flow chart illustrating the procedure which is executed when the length of the read-out image data in the sub-scan direction does not match the length of a designated paper size in the main scan direction.

FIG. 15 is a block diagram showing the structure of a facsimile apparatus according to a second embodiment of this invention.

FIG. 16 is a block diagram showing the structure of a facsimile apparatus according another embodiment of this invention.

FIG. 17A is a view showing arragement of the image data memory, and FIG. 17B is a diagram showing the relation between pages and a display output format on a recording sheet.

Figure 18:
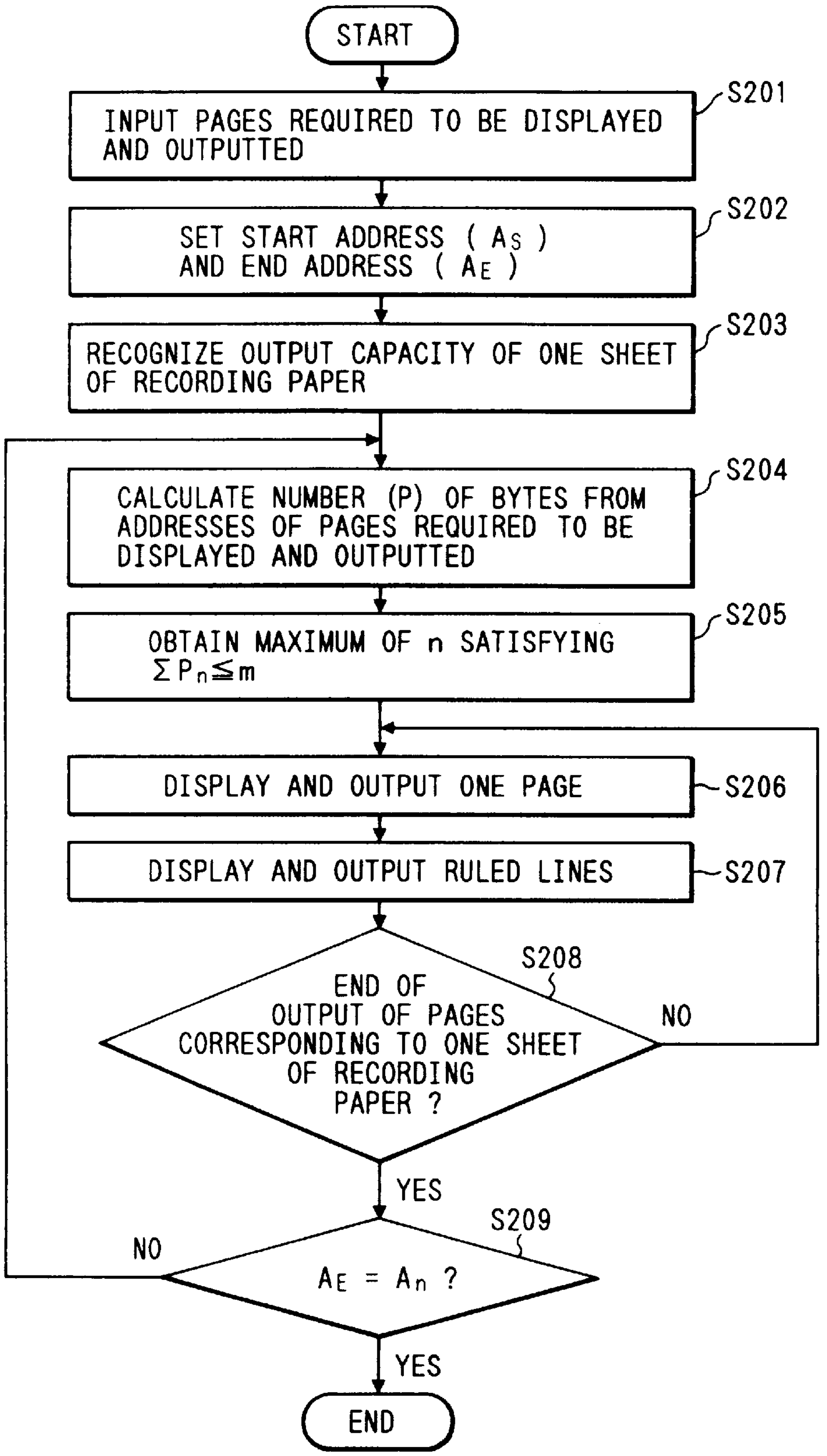
FIG. 18 is a flow chart illustrating the control procedure wherein image data within an image data memory is outputted and displayed on a recording sheet.

FIG. 18 is a flow chart illustrating the control procedure wherein image data within an image data memory is outputted and displayed on a recording sheet.

FIG. 19 is a flow chart illustrating the control procedure wherein the resolution of image data is converted and thereafter the image data is stored.

FIG. 20 is a flow chart illustrating the control procedure wherein image data is outputted, displayed, and transmitted to a communication line.

DETAILED DESCRIPTION OF THE PREFERRED EMBODIMENTS

Embodiments of this invention will be described with reference to the accompanying drawings.

FIG. 1 is a block diagram showing the first embodiment of this invention.

A handy scanner 11 is held with a hand to scan an original image as shown in FIG. 2, and is connected via cable to a facsimile apparatus.

An image processor 12 has a function to binarize (i.e. to convert to binary data) the multi-value density data of a read-out image.

An image memory controller 13 stores binarized image data or received image data.

A communication controller 14 controls the communication procedure and the like, encodes and transmits image data, and decodes encoded and received data. The communication controller 14 has a modem for modulating and transmitting data and demodulating data from the line 19.

A loudspeaker 15 generates alarm sounds or the like.

A console unit 16 is constructed of various input key switches, a key input scan circuit, a liquid crystal display, and the like.

A printer 17 outputs image data stored in an image memory of the image memory controller 13.

A control unit 18 is constructed of a micro-computer, ROM, RAM and the like, and executes a control program stored in ROM to thereby control the operation of the apparatus.

The operation of the facsimile apparatus constructed as above will be described next.

The handy scanner 11 has a line CCD sensor whose width corresponds to an image reading width, and reads an image one line after another. For example, as shown in FIG. 2, when a read switch 22 is depressed, an LED array turns on to illuminate an image surface 23 and becomes ready for reading. As the handy scanner 11 is moved in the direction indicated by arrow A, a line synchronization signal is generated in synchronization with rotation of a rubber roller mounted at the bottom surface of the handy scanner 11. In synchronism with this line synchronization signal, the CCD sensor reads image data which is converted into a serial signal and transmitted to the facsimile apparatus. The image data is binarized by the image processor 12, and stored in the image memory of the image memory controller 13 for line/column exchange thereof.

This line/column exchange is executed by a memory address control unit, an n×n column/line exchange circuit, and the image memory respectively provided within the image memory controller 13.

The above processes will be detailed below.

It is assumed that image data read with the handy scanner is a bit map data having x lines and y columns as shown in FIG. 3, where $(m-2)\,n<x\leq(m-1)\,n$, and $(l-2)\,n<y\leq(l-1)\,n$.

On each line, one word is written by n bits. For example, on the first line, there are written l words including a word (0, 0) of n bits of 0 to n−1 to a word (0, (l−1)) of n bits of y−n to y−1.

As shown in FIG. 4, assuming that the first line is written in the image memory at an address <u>z</u>, the following words are written at addresses each incremented by <u>x</u> from the address <u>z</u>.

The second line is written at an address z+1 and the following words are written at addresses incremented by <u>x</u> from the address z+1.

The image data is stored in the image memory of the image memory controller 13 at memory addresses outputted from the image memory controller 13, in such a state that n-bit words are divided into each column as shown in FIG. 5.

FIG. 6 is a flow chart illustrating the data input operation into the image memory.

When an image is inputted to the image memory, the read address z of the image data is set as a start address S of the image memory, and the number x of lines is set as a memory address jump number J (step S1).

Next, one line image data starts being inputted (step S2). In this input operation, memory addresses are sequentially jumped by x addresses. Each time one line image data has been inputted (step S3), the address S is incremented by 1 (step S4) to start inputting the next line image (step S2). The above operations are repeated until one page is completely inputted (step S5). As shown in FIG. 5, n-bit words are stored in the image memory in a chain of the line direction at consecutive addresses as shown in FIG. 5.

Next, the image data written in the image memory is column/line exchanged in units of n×n bits by the n×n column/line exchange circuit of the image memory controller 13.

FIG. 7 shows the image memory storing the image data divided into blocks each being constructed of n×n bits. There are l×m blocks from [0, 0] to [m−1, l−1]. Lines and columns of each block are exchanged to perform n×n column/line exchange.

FIG. 8 is a schematic diagram showing the images and addresses of two blocks [0, l−1] and [1, l−1] before the n×n column/line exchange. FIG. 9 is a schematic diagram showing the images and addresses of the two blocks after the n×n column/line exchange.

In FIG. 9, it can be understood that the column/line exchanged image is obtained from consecutive data (0, l−1)', (n, l−1)', . . . in the direction indicated by arrow B.

FIG. 10 is a flow chart showing the image data read/write operation at the time of n×n column/line exchange.

First, there are set a read-out start address, read-out end address, and read-out jump number (step S11), to thereafter start reading an image data (steps S12, S13).

Next, there are set a write start address, write end address, and write jump number (step S14), to thereafter start writing an image data in a column/line exchanged state (steps S15, S16).

Since the image memory addresses are {z+(l−1) x}, {z+(l−1) x+n}, and {z+(l−1) x+2n}, the image memory addresses are controlled in the manner as shown in FIG. 11 to output the column/line exchanged image to the communication controller 14.

Specifically, there are first set the start address as {z+(l−1) x}, the end address as {z+lx−n}, and the jump number as n. As variables ID1 and ID2 indicative of the numbers of read-out data and lines, n and l are set (step S21).

Reading the image data starts (step S22). Each time one data is read (step S23), ID1 is incremented by 1 (step S24). If ID1 is not "0" (step S25), the start address and end address each are incremented by 1 (step S26).

If ID1 is "0" (step S25) and ID2 is not "0" (step S27), ID2 is decremented by 1, and the start address is set to {z+(ID2−1) x} and the end address is set to {z+ID2x−n} (step S28). The control then returns to step S22 to repeat the above read-out operation. The control terminates when ID2 becomes "0".

FIG. 12 shows the structure of the n×n column/line exchange circuit. This structure shows an example of 4×4 bits. As shown in FIG. 12, sixteen registers 111 to 126 are disposed in matrix and connected to the data base. For the 4×4 column/line exchange using the matrix registers 111 to 126, the data (111 to 114), (115 to 118), (119 to 122), and (123 to 126) are written in units of column, and the data (114, 118, 122, 126), (113, 117, 121, 125), (112, 116, 120, 124), and (111, 115, 119, 123) are read in units of line.

FIG. 13 shows the structure of the image memory controller 13.

A read-out or write start address is stored in a register at first. The address outputted from the register 131 is incremented by the jump number at an adder 132 each time the image memory is accessed, and the updated address is again stored in the register 131. The updated address is compared with the end address at a comparator 133. If the memory address becomes coincident with the end address, a coincidence signal is issued.

The column/line exchange is realized in the above manner. In this embodiment, the column/line exchange is executed by setting y=(a length of a designated paper sheet in the main scan direction).

There will be described the processing for the case where the length of a read-out image data in the sub-scan direction is shorter or longer than the length of a designated paper sheet on the main scan direction.

FIG. 14 is a flow chart illustrating the control operation for the above case.

First, addresses and jump number are set (step S31) to start inputting an image data (step S32) and store it in the image memory in units of one line (step S33). The control unit 18 counts the number of lines (steps S34, S35). If the number of lines exceeds the number corresponding to the length of the designated paper sheet in the main scan direction (step S36), alarm sounds are generated from the loudspeaker 15 (step S37). Then, inputting an image data is terminated to execute the n×n column/line exchange by the image memory controller 13 (step S38). The image data is then read out to the communication controller 14 whereat it is compress-encoded for the transmission thereof (steps S39, S40).

If the number of lines is smaller than the number corresponding to the length of the designated paper sheet (step S41), the control unit 18 causes 0 data to be written for the empty portion of the designated paper sheet (step S42). Thereafter, the similar operations as above are executed to transmit the image data (steps S43, S44, S38 to S40).

In this case, instead of writing 0 data, the communication controller 14 may mask the image data at the time of compression-encoding to thereby realize white pixels of the empty portion of the image data.

As described above, in this embodiment, if the reading length of the handy scanner is short, the empty portion of the image data is made white data, thereby executing data transmission without waste. On the contrary if the reading length is long, the excessive portion is neglected and alarm sounds are generated to notify an operator of such a case.

FIG. 15 is a block diagram showing the second embodiment of this invention.

As shown in FIG. 15, it is possible that an image data stored in an image memory 153 is column/line exchanged and compression-encoded to transmit it under control of the microcomputer of a control unit 158. The other structure is the same as the first embodiment and the description therefor is omitted merely by giving identical reference numerals to those elements similar to those in FIG. 1.

According to the first and second embodiments, an image data of an image having a longer vertical side read with a small handy scanner in a main scan direction is column/line exchanged and transmitted basing on the length of a designated paper sheet in the main scan direction. Accordingly, wasteful use of paper sheets can be avoided, and transmission time and communication cost can be reduced.

Next, there will be described the third embodiment wherein a plurality of pages are recorded on a single recording sheet (cut sheet).

FIG. 16 is a block diagram showing the structure of a facsimile apparatus of the third embodiment.

In FIG. 16, a central controller 201 controls all operations of the facsimile apparatus. Programs for the control operation of the central controller 201 are stored in a ROM 202. A RAM 203 temporarily stores control data and the like. A console unit 208 is used for transmitting an image data, requesting for displaying an image data, and other operations.

In transmitting an image data, an image is optically read with an image reader 207, photoelectrically converted with a CCD or the like, and binarized by an A/D converter 215. The binarized image data is encoded by an encoder 204 into a signal suitable for transmission such as an MMR, MR, or MH signal according to CCITT Recommendations, and transmitted via a communication controller 206 to a communication line 214. In receiving an image data, an image data from the line 214 is sent via the communication controller 206 to a decoder 205 whereat it is decoded into a signal having a format suitable for digital processing. The decoded data is stored in an image data memory 209 constructed of semiconductor memories and the like.

The data stored in the image data memory 209 is processed in the following manner depending upon the resolution of a display unit 216. Specifically, a resolution converter 210 sequentially reads data stored in the image data memory 209, converts its resolution so as to match the resolution of the display unit 216 constructed of a CRT, liquid crystal display or the like. The image data with a converted resolution is stored in a converted image memory. Each time a request for displaying an image data, an image data stored in the converted image memory 211 is outputted to the display unit 216.

An image output unit 213 is constructed of a laser printer, a thermal printer, or a bubble jet printer which ejects ink by generating a bubble with heat. When a request for displaying an image data, the image output unit 213 receives an image data from the communication controller 206, or receives an image data read with the image reader 207, A/D converted by the A/D converter 215, and read from the image data memory 209 without being subjected to the resolution conversion. At the same time, a paper feeder 212 receives an instruction from the central controller 201 to feed a recording sheet to the image output unit 213 to thereby display an image having a resolution at the time of image data reception or at the time of image data reading with the image reader 207.

FIG. 17A shows the structure of the image data memory 209. Image data are designated by addresses shown in FIG. 17, respectively. Each image data having Pn (n is a page number) bytes is stored as the first to x-th pages in the image data memory 209 having M byte image data in total. FIG. 17B shows the relation between a display format on a recording sheet and a page.

As shown in FIG. 17B, each recording sheet is arranged to be capable of recording m byte image data (the value m changes with the size of a recording sheet). To this end, the central controller 201 shown in FIG. 16 performs the following calculations for displaying an image data.

Specifically, for displaying an image data on a first recording sheet shown in FIG. 17B, the byte numbers of an image data is calculated from the addresses of the image data stored in the image data memory. The byte numbers are added together. For example, if the results are:

P1+P2<m, and P1+P2+P3>m, the first and second pages only are recorded on the first recording sheet. Similarly, if the results are:

P3+P4+P5<m, and P3+P4+P5+P6>m the third to fourth pages are recorded on the second recording sheet. Namely, image data sufficing the condition of $P_n+P_{n+1}+P_{n+2}+\ldots \leqq m$ (n is the page number) is recorded on a single recording sheet. The blank portion of a recording sheet is therefore made minimum while recording the maximum number of pages. As shown in FIG. 17B, a separation line (a broken line in FIG. 17B) is drawn on a recording sheet for indicating a partition between pages.

Next, with reference to the flow chart of FIG. 18, there will be described the procedure to be carried out by the facsimile apparatus of this embodiment for displaying (recording) an image data in the image data memory on a recording sheet.

Upon a request of displaying an image data of the first to x pages stored in the image data memory at step S201, there are set at step S202 a start address As (address 0 in this embodiment) and an end address Ae. Next at step S203 the output capacity (byte number) of a single recording sheet is recognized in accordance with the information of a recording sheet within the paper feeder.

At step S204 the byte number (P) is calculated from the addresses of display requested pages. At step S205 the number of pages capable of being recorded on a single recording sheet is obtained from the byte number. Specifically, the maximum value n satisfying $\Sigma$ Pn$\leqq$m is obtained, the value n corresponding to the maximum pages capable of being recorded on a single recording sheet. At step S206 an image data for one page is displayed. At the next step S207, a separation line is displayed.

At step S208, it is checked if an image data for one page has been displayed or not. If not, the control returns to step S206 to display the next page image data. If an image data for one page has been displayed, it is checked at step S209 whether or not the address An of the page last displayed is the end address $A_E$. If not, the control returns to step S204 to display an image data for the next recording sheet. If both the addresses are equal to each other, it means that the image data of all requested pages has been displayed so that the control is terminate.

FIG. 19 is a flow chart illustrating the procedure to be carried out by the facsimile apparatus of this embodiment for converting the resolution of image information received from the communication line or read with the image reader and storing the resolution converted image information in the image data memory.

In FIG. 19, at step S221 an empty area (A bytes) of the image data memory are reserved for the image data from the communication controller and decoder or for the image data from the image reader and A/D converter. At step S222 actual write operation and memory address updating are executed. At step S223 the write data amount (a bytes) is compared with the empty area (A bytes) of the image data memory. If they are not equal, it means that the write operation is not still completed, so the control returns to step S222. If they are equal, it means that the write operation has been completed, so at step 224 the resolution of the display unit is checked to calculate the byte number (b bytes) after the resolution conversion.

An empty area (B bytes) of the converted image memory after the resolution conversion is reserved at step S225. At step S226, the resolution conversion is executed. The resolution converted image data is stored in the converted image memory at step S227, and at the same time the memory addresses are updated. If the empty area (B bytes) of the converted image memory becomes equal to the written byte number at step S228 after the memory address updating, it means that the converted image has been fully stored. If not, the control returns to step S227 to continue storing the image data.

FIG. 20 is a flow chart illustrating the procedure to be carried out by the facsimile apparatus of this embodiment for transmitting an image data to the line.

Upon a request for displaying an image data on the display unit at step S240 in FIG. 20, the display request range of an image data within the converted image memory is checked at step S241. At step S242 the image data within the request range stored in the converted image memory is sequentially transferred to the display unit. It is checked at step S243 whether or not the image data within the request range has been transferred. If the data transfer has been completed, the control returns to step S242 to continue the data transfer operation.

Upon a request for transmitting image data to the line at step S244, the communication controller is set to a transmission mode at step S245. The transmission request range of image data within the image data memory is checked at step S246. At the next step S247 the contents of the image data memory are sequentially sent to the encoder. At step S248 the communication controller transmits the image data to the line. Completion of sending and transmitting the image data is checked at step S249. If not completed at yet, the control returns to steps S247 and S248 to continue the transmission procedure.

If there is no display request and transmission request respectively at steps S240 and S244, then other processes are executed at step S250.

As described above, according to the embodiment, it is possible to sequentially display and output plural pages of images on a single recording paper at a received and so that an operator who uses a facsimile machine having small capacity for one communication can avoid a waste of recording papers. In particular, as seen from FIG. 17B, as compared with a conventional apparatus which requires n sheets of recording papers to record n pages, the present invention can cut down papers to be required very much.

Also, whether a cut paper at a roll paper is used, the present invention provides the advantage of protection from confusion or misunderstanding of communicated contents because ruled lines are formed to separate each of plural displayed and outputted images at the last page.

Further, two types of resolution for one image data are prepared to match resolution of a display unit of an image output unit so that it is not required to execute resolution conversion so as the display data on a low resolution display unit. Also, since there is small amount of data to be processed, a time required to transfer data is short, high speed data retrieval is realized, and quick data editor is attained even when a low resolution display unit is used.

Furthermore, as for the output or transmission of a high resolution image, high resolution image data is directly read out from a storage and processed without resolution conversion.

As described above, according to the third embodiment it is possible to record images of a plurality of pages on a single recording sheet while allowing to readily discriminate separations between pages, and to search stored image data at high speed.

In the above embodiments, a facsimile apparatus has been described by way of example. The present invention can be applied not only to facsimile apparatuses but also other various data communication apparatuses such as telex machines.

The present invention is not limited only to the above embodiments, but various modifications are possible.

What is claimed is:

1. A data communication apparatus comprising:

a receiver adapted for receiving image data representing images of a plurality of pages;

a memory for storing the received image data;

a recording unit adapted for recording the stored image data on a recording sheet of a predetermined size; and a control circuit adapted for controlling said recording unit to record the received images of a plurality of pages on a single recording sheet, wherein said control circuit determines a number of pages of the stored image data to be recorded on the single recording sheet by comparing a data amount of a sum of a desired number of pages of the stored image data with a data amount recordable on the single recording sheet, and said control circuit controls said recording unit to record the desired number of pages on the single recording sheet when the data amount of the sum of the desired number of pages is not more than the data amount recordable on the single recording sheet and a data amount of the sum of the desired number of pages plus one page exceeds the data amount recordable on the single recording sheet, and wherein, even when the desired number of pages is two or more, said control circuit determines the desired number of pages by comparing the amount of the sum of the desired number of pages plus a next page, and keeps a page order with the data amount recordable on the single recording sheet.

2. A data communication apparatus according to claim 1, wherein said control circuit controls said recording unit to record information indicating a separation between pages of received images of a plurality of pages recorded on the single recording sheet.

3. A data communication apparatus according to claim 1, further comprising:

an image data display unit for displaying the stored image data;

a conversion circuit adapted for converting a resolution of the stored image data into a resolution for input to said image data display unit; and a second memory for storing image data having a resolution converted by said conversion circuit.

4. A data communication method comprising the steps of:

receiving image data representing images of a plurality of pages;

storing the received image data;

recording the stored image data on a recording sheet of a predetermined size; and controlling the recording step to record the received images of a plurality of pages on a single recording sheet, including determining a number of pages of the stored image data to be recorded on a single recording sheet by comparing a data amount of a sum of a desired number of pages of the stored image data with a data amount recordable in the single recording sheet and recording the desired number of pages on the single recording sheet when the data amount of the sum of the desired number of pages is not more than the data amount recordable in the single recording sheet and a data amount of the sum of the desired number of pages plus one page exceeds the data amount recordable on the single recording sheet, wherein, even when the desired number of pages is two or more, said controlling step determines the desired number of pages by comparing the amount of the sum of the desired number of pages plus a next page, and keeps a page order with the data amount recordable on the single recording sheet.

5. A data communication method according to claim 4, wherein said controlling step controls said recording step to record information indicating a separation between pages recorded on the single recording sheet.

6. A data communication method according to claim 4, further comprising the steps of:

displaying the stored image data;

converting a resolution of the stored image data into a resolution for input to an image data display to provide converted image data; and storing the converted image data.

7. A data communication apparatus comprising:

a recording unit adapted for recording data on recording paper;

an identification circuit adapted for identifying a size of data of a plurality of pages;

a determination circuit adapted for determining a number of pages of the data to be recorded by said recording unit on one sheet of the recording paper based on a sum obtained by adding sizes of data of a plurality of pages in page order; and a control circuit adapted for controlling said recording unit to record the determined number of pages of the data on the one sheet of the recording paper, wherein said determination circuit determines the number of pages of the data to be recorded on the one sheet of recording paper such that a size of the number of pages is smaller than a size of the one sheet of recording paper and such that a size of the number of pages plus one more page is larger than the size of the one sheet of recording paper, and wherein, even when the number of pages is two or more, said determination circuit determines the number of pages by comparing the size of the number of pages plus a next page, and keeps a page order with the size of the one sheet of recording paper.

8. An apparatus according to claim 7, wherein the data is image data received from a remote location.

9. An apparatus according to claim 7, wherein the one sheet of recording paper is a cut sheet of predetermined size.

10. An apparatus according to claim 7, wherein said identification circuit identifies the size of the data based on a data amount of the data.

11. An apparatus according to claim 7, further comprising a memory for storing the data prior to recording.

12. An apparatus according to claim 11, wherein said identification circuit detects a data amount of the data using an address of the data in said memory and identifies the size of the data based on the detected data amount.

13. An apparatus according to claim 7, wherein said determination circuit detects a size of the one sheet of recording paper based on information set in said recording unit, and determines the number of pages of the data to be recorded on the one sheet of recording paper based on the detected size of the one sheet of recording paper.

14. An apparatus according to claim 7, wherein said control circuit causes said recording unit to record an image representing a partition on the one sheet of recording paper between each two adjacent pages of the data as recorded.

15. An apparatus according to claim 7, wherein the data is image data obtained by reading an original document.

16. An apparatus according to claim 7, wherein said data communication apparatus is a facsimile apparatus.

17. An apparatus according to claim 7, wherein the data is image data.

18. A data communication method comprising the steps of:

recording data on recording paper;

identifying a size of data of a plurality of pages;

determining a number of pages of the data to be recorded in said recording step on one sheet of the recording paper based on a sum obtained by adding sizes of data of a plurality of pages in page order; and controlling said recording step to record the determined number of pages of the data on the one sheet of the recording paper, wherein said determining step determines the number of pages of the data to be recorded on the one sheet of recording paper such that a size of the number of pages is smaller than a size of the one sheet of recording paper and such that a size of the number of pages plus one more page is larger than the size of the one sheet of recording paper, and wherein, even when the number of pages is two or more, said step of determining determines the number of pages by comparing the size of the number of pages plus a next page, and keeps a page order with the size of the one sheet of recording paper.

19. A method according to claim 18, wherein the data is image data received from a remote location.

20. A method according to claim 18, wherein the one sheet of recording paper is a cut sheet of predetermined size.

21. A method according to claim 18, wherein said identifying step identifies the size of the data based on a data amount of the data.

22. A method according to claim 18, further comprising the step of storing the data in a storage device prior to recording.

23. A method according to claim 18, wherein said identifying step detects a data amount of the data using an address of the data in the storage device, and identifies the size of the data based on the detected data amount.

24. A method according to claim 18, wherein said determining step detects a size of the one sheet of recording paper based on information set for use in said recording step, and determines the number of pages of the data to be recorded on the one sheet of recording paper based on the detected size of the one sheet of recording paper.

25. A method according to claim 18, wherein said controlling step causes said recording step to record an image representing a partition on the one sheet of recording paper between each two adjacent pages of the data as recorded.

26. A method according to claim 18, wherein the data is image data obtained by reading an original document.

27. A method according to claim 18, wherein the data communication method is a facsimile method.

28. A method according to claim 18, wherein the data is image data.

* * * * *